US012249270B2

(12) United States Patent
Huo

(10) Patent No.: US 12,249,270 B2
(45) Date of Patent: Mar. 11, 2025

(54) DISPLAY PANEL, METHOD FOR DRIVING THE SAME, AND DISPLAY APPARATUS

(71) Applicant: Tianma Advanced Display Technology Institute (Xiamen) Co.,Ltd., Xiamen (CN)

(72) Inventor: Sitao Huo, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 18/334,895

(22) Filed: Jun. 14, 2023

(65) Prior Publication Data

US 2023/0326403 A1 Oct. 12, 2023

(30) Foreign Application Priority Data

Mar. 30, 2023 (CN) ........................ 202310328454.0

(51) Int. Cl.
*G09G 3/32* (2016.01)

(52) U.S. Cl.
CPC ....... *G09G 3/32* (2013.01); *G09G 2300/0842* (2013.01); *G09G 2310/08* (2013.01); *G09G 2320/0223* (2013.01); *G09G 2320/0233* (2013.01); *G09G 2320/041* (2013.01)

(58) Field of Classification Search
None
See application file for complete search history.

(56) References Cited

U.S. PATENT DOCUMENTS

2015/0154910 A1* 6/2015 Okuno ................. G09G 3/3283 345/212
2019/0287452 A1* 9/2019 Wang ..................... G09G 3/325
2022/0180802 A1* 6/2022 Cong ....................... G09G 3/32
2023/0029234 A1* 1/2023 Son ...................... G09G 3/3233
2023/0196996 A1* 6/2023 Zhao .................... G09G 3/3233
2023/0395023 A1* 12/2023 Uchida ................ G09G 3/3233

FOREIGN PATENT DOCUMENTS

CN 102450099 A 5/2012

* cited by examiner

*Primary Examiner* — Joseph R Haley
(74) *Attorney, Agent, or Firm* — Christensen O'Connor Johnson Kindness PLLC

(57) ABSTRACT

A display panel, a method for driving a display panel, and a display apparatus are provided. The display panel includes first sub-pixels. At least one of the first sub-pixels includes a first pixel circuit and a first light-emitting element. The first pixel circuit includes a display controller and a detector that are electrically connected to a first electrode of the first light-emitting element, respectively. An operating process of the first pixel circuit includes a detection stage. In the detection stage, the detector is turned on to detect a voltage of the first electrode of the first light-emitting element.

19 Claims, 18 Drawing Sheets

DISPLAY PANEL, METHOD FOR DRIVING THE SAME, AND DISPLAY APPARATUS

CROSS-REFERENCE TO RELATED APPLICATION

The present application claims priority to Chinese Patent Application No. 202310328454.0, filed on Mar. 30, 2023, the content of which is incorporated herein by reference in its entirety.

TECHNICAL FIELD

The present disclosure relates to the field of display technologies, and particularly, relates to a display panel, a method for driving a display panel, and a display apparatus.

BACKGROUND

Device characteristics of a light-emitting element in a light-emitting diode (LED) display panel are greatly affected by a temperature change. Especially when the display panel displays an image for a long time, the light-emitting element dissipates a large amount of heat, resulting in a higher temperature. This causes a significant shift of the device characteristics of the light-emitting element, thereby causing a brightness or color deviation of the display panel.

SUMMARY

In a first aspect, the present disclosure provides a display panel. The display panel includes first sub-pixels. At least one of the first sub-pixels includes a first pixel circuit and a first light-emitting element. The first pixel circuit includes a display controller and a detector that are electrically connected to a first electrode of the first light-emitting element, respectively. An operating process of the first pixel circuit includes a detection stage. In the detection stage, the detector is turned on to detect a voltage of the first electrode of the first light-emitting element.

In a second aspect, the present disclosure provides a method for driving the display panel described in the first aspect. The method comprises: controlling the detector to be turned on in the detection stage to detect the voltage of the first electrode of the first light-emitting element; determining a current temperature of the first light-emitting element based on the detected voltage of the first electrode of the first light-emitting element; and compensating a data voltage of the first sub-pixel based on the current temperature.

In a third aspect, the present disclosure provides a display apparatus. The display apparatus includes a display panel. The display panel includes first sub-pixels. At least one of the first sub-pixels includes a first pixel circuit and a first light-emitting element. The first pixel circuit includes a display controller and a detector that are electrically connected to a first electrode of the first light-emitting element, respectively. An operating process of the first pixel circuit includes a detection stage. In the detection stage, the detector is turned on to detect a voltage of the first electrode of the first light-emitting element.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

It should be understood that the term "and/or" used in the context of the present disclosure is to describe a correlation relation of related objects, indicating that there can be three relations, e.g., A and/or B can indicate only A, both A and B, and only B. In addition, the symbol "/" in the context generally indicates that the relation between the objects in front and at the back of "/" is an "or" relationship.

As described in BACKGROUND, device characteristics of a light-emitting element in an LED display panel is greatly affected by a temperature change, so that a deviation of display effect of the display panel occurs.

In this regard, in the related art, it is necessary to detect a temperature of the light-emitting element, and then perform corresponding brightness compensation for the display panel based on the temperature change of the light-emitting element. However, the inventor found that a current manner for detecting the temperature of the light-emitting element is not only structurally complex, but also has poor detection accuracy.

Figure 1:
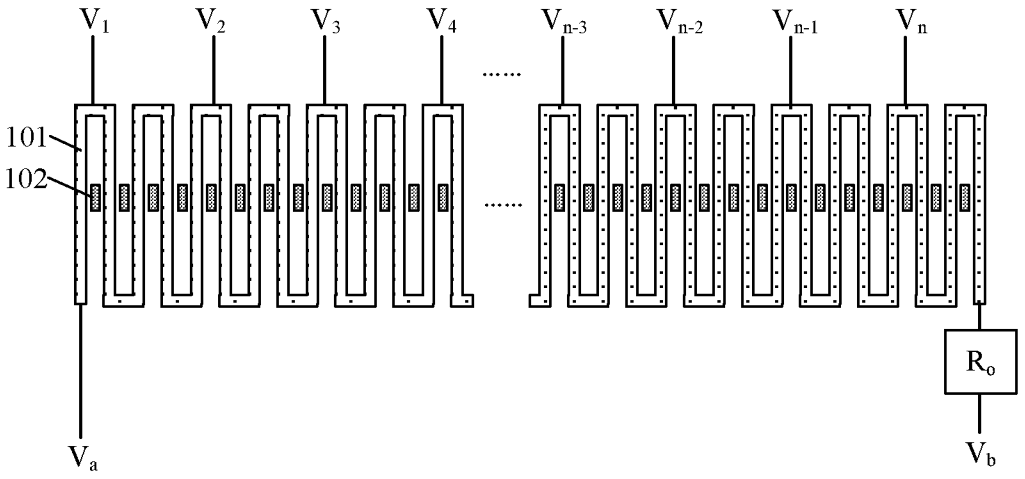
FIG. 1 is a structural schematic diagram of a display panel in the related art.

For example, as shown in FIG. 1, FIG. 1 is a structural schematic diagram of a display panel in the related art. The display panel includes a detection metal wire 101. The detection metal wire 101 surrounds light-emitting elements 102 in a display region. One end of the detection metal wire 101 receives a voltage $V_a$, and the other end of the detection metal wire 101 is connected in series to a fixed resistor $R_0$. One end of the fixed resistor $R_0$ receives a voltage Vb.

Figure 2:
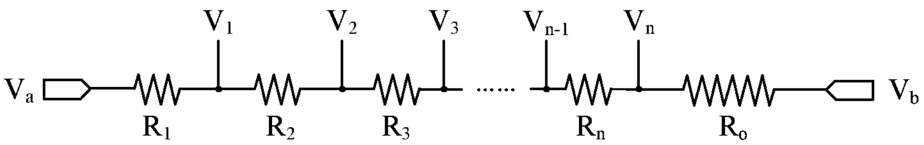
FIG. 2 is an equivalent circuit diagram of FIG. 1 in the related art.

In the above structure, as shown in FIG. 2, FIG. 2 is an equivalent circuit diagram of FIG. 1 in the related art. The detection metal wire 101 can be regarded as a structure constituted by n wire segments in series, and resistances of the n wire segments are represented by $R_1$, $R_2$, . . . , and $R_n$, respectively. Because a resistance value of a wire varies with a temperature, a resistance value $R_k$ of a $k^{th}$ wire segment can be obtained according to a formula $$R_k = \frac{V_a - V_k}{V_n - V_b} \times R_o$$

by measuring a node voltage $V_k$ corresponding to the $k^{th}$ wire segment, where k=1, 2, . . . , and n. Further, based on a change of the resistance value of the $k^{th}$ wire segment, a temperature change of the light-emitting element 102 surrounded by the $k^{th}$ wire segment can be calculated.

However, in the above detection manner, a long detection metal wire 101 needs to be additionally disposed in the display panel. The detection metal wire 101 also needs to surround the light-emitting elements 102, which is complex in structure and high in cost. Moreover, the detection metal wire 101 is spaced from the light-emitting element 102 by a particular distance when surrounding the light-emitting elements 102. Therefore, a change of a resistance value of a wire segment in the detection metal wire 101 cannot truly and accurately reflect the dissipated heat of the light-emitting element 102 surrounded by the detection metal wire 101, resulting in low detection accuracy.

In addition, the detection metal wire 101 occupies large area in the display region, which not only impedes further improvement of pixel density, but also affects light transmittance of the display panel, which is not conducive to a structural design of a transparent display panel.

Therefore, the embodiments of the present disclosure provide a display panel. The display panel can accurately determine a temperature change of a light-emitting element without a complex detection structure, thereby effectively improving brightness compensation effect of the display panel.

Figure 3:
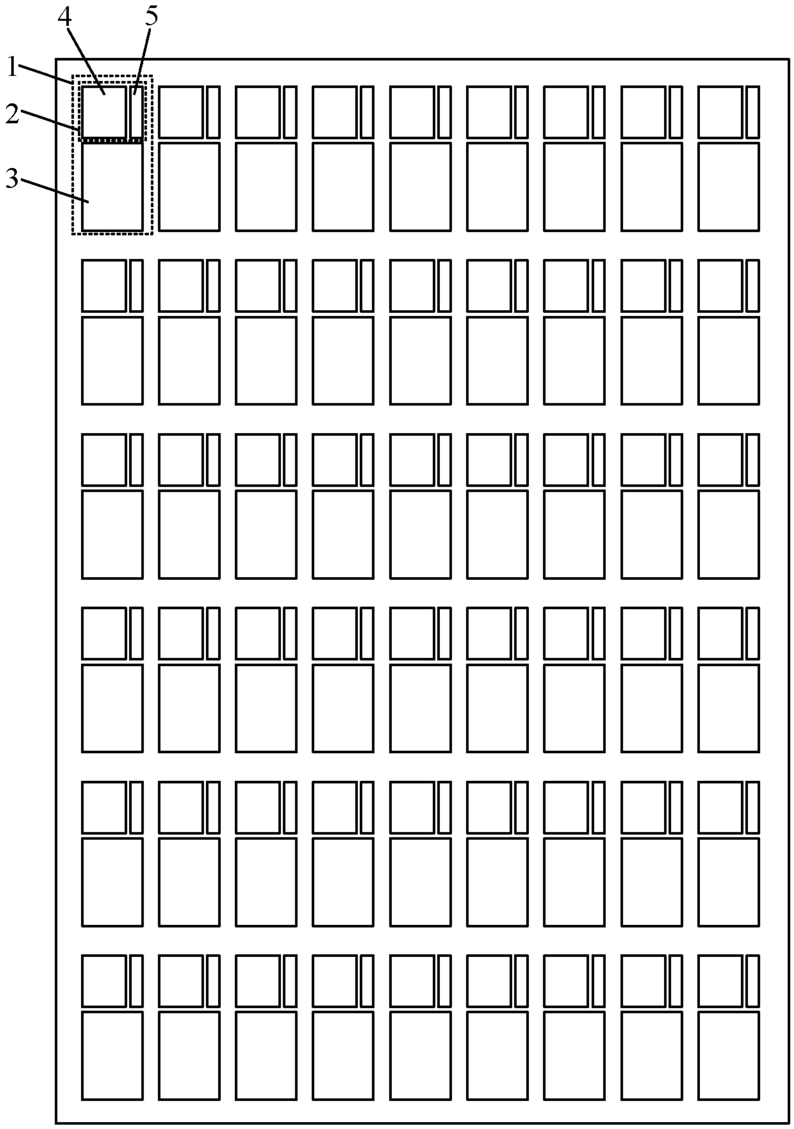
FIG. 3 is a structural schematic diagram of a display panel according to an embodiment of the present disclosure.
Figure 4:
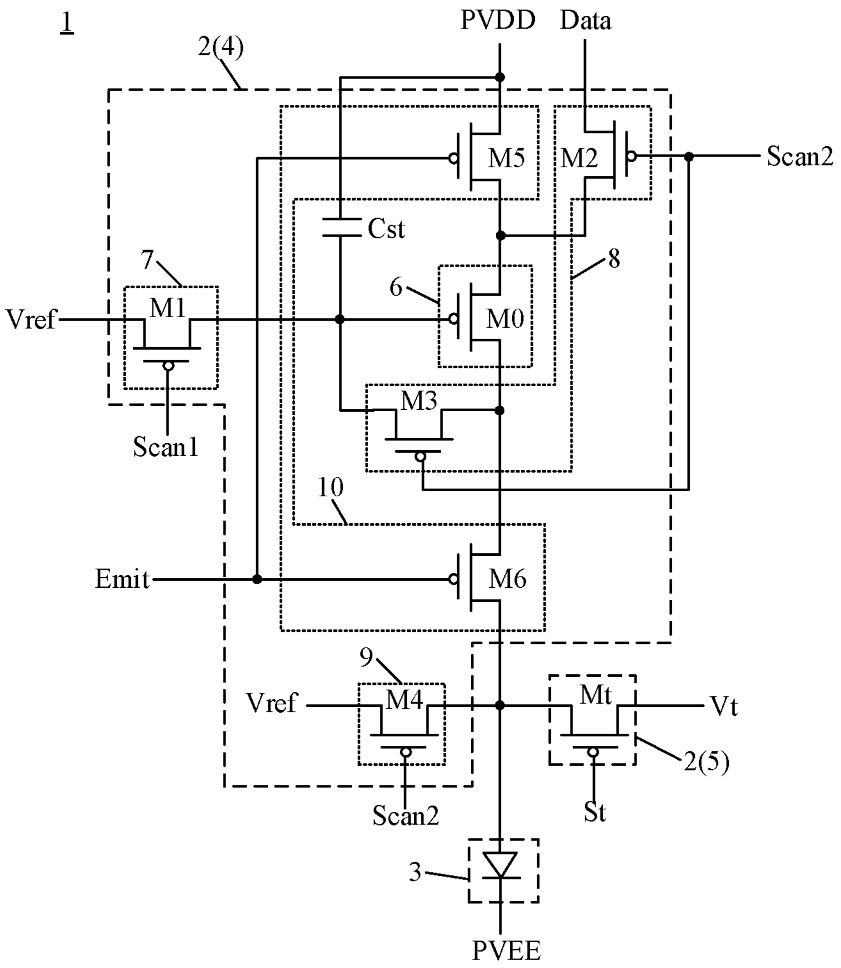
FIG. 4 is a structural schematic diagram of a first sub-pixel according to an embodiment of the present disclosure.

FIG. 3 is a structural schematic diagram of a display panel according to an embodiment of the present disclosure; and FIG. 4 is a structural schematic diagram of a first sub-pixel 1 according to an embodiment of the present disclosure. As shown in FIG. 3 and FIG. 4, the display panel includes first sub-pixels 1. The first sub-pixel 1 includes a first pixel circuit 2 and a first light-emitting element 3. The first pixel circuit 2 includes a display controller 4 and a detector 5. The display controller 4 and the detector 5 are electrically connected to a first electrode of the first light-emitting element 3 respectively. The first light-emitting element 3 can be an LED, which can be a mini-LED or a micro-LED. The first electrode of the first light-emitting element 3 is a positive electrode of the first light-emitting element 3.

An operating process of the first pixel circuit 2 includes a detection stage. In the detection stage, the detector 5 is turned on to detect a voltage of the first electrode of the first light-emitting element 3.

Figure 5:
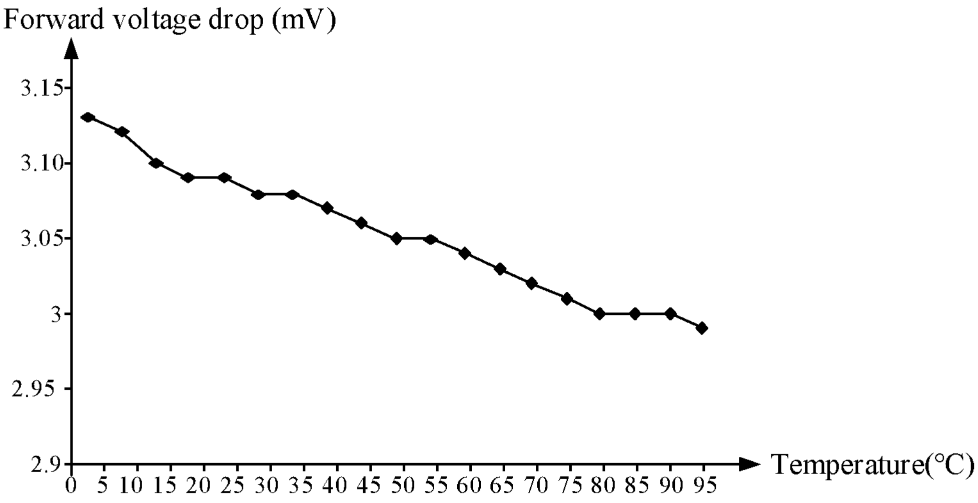
FIG. 5 is a schematic diagram of a forward voltage drop of an LED varying with a temperature according to an embodiment of the present disclosure.

The inventor found that when an LED emits light under the action of a driving current, a forward voltage drop of the LED, i.e., a voltage difference between a first electrode and a second electrode of the LED, varies with a temperature. FIG. 5 is a schematic diagram of a forward voltage drop of an LED varying with a temperature according to an embodiment of the present disclosure. With reference to Table 1 and FIG. 5, it can be seen that the forward voltage drop of the LED shows a downward trend as the temperature increases.

TABLE 1

| | | | | | | | | | | |
|---|---|---|---|---|---|---|---|---|---|---|
| Temperature (° C.) | 0 | 5 | 10 | 15 | 20 | 25 | 30 | 35 | 40 | 45 |
| Forward voltage drop (mV) | 3.13 | 3.12 | 3.10 | 3.09 | 3.09 | 3.08 | 3.08 | 3.07 | 3.06 | 3.05 |
| Temperature (° C.) | 50 | 55 | 60 | 65 | 70 | 75 | 80 | 85 | 90 | |
| Forward voltage drop (mV) | 3.05 | 3.04 | 3.03 | 3.02 | 3.01 | 3.00 | 3.00 | 3.00 | 2.99 | |

Based on above characteristics of the LED, in the embodiments of the present disclosure, the detector 5 being capable of detecting the voltage of the first electrode of the first light-emitting element 3 is disposed in the first pixel circuit 2 to collect the voltage of the first electrode of the first light-emitting element 3. Because a second electrode of the first light-emitting element 3 in the display panel receives a same negative supply voltage, a forward voltage drop of the first light-emitting element 3 can be accurately obtained based on the collected voltage of the first electrode of the first light-emitting element 3. Further, a current temperature of the first light-emitting element 3 can be obtained based on a mapping relationship between temperature and forward voltage drop. Then, brightness compensation can be performed for the first sub-pixel 1 based on the current temperature of the first light-emitting element 3 subsequently to adjust brightness of the first sub-pixel 1 to standard brightness.

In such a manner, the first light-emitting element 3 integrates heat/temperature sensing functions, and can provide accurate data support for the subsequent brightness compensation for the first sub-pixel 1 based on only the voltage collected by the detector 5 in the first pixel circuit 2.

Moreover, compared with the related art, the detector 5 in the embodiments of the present disclosure directly collects the voltage of the first electrode of the first light-emitting element 3. The voltage can directly and accurately reflect the current temperature of the first light-emitting element 3, thus effectively improving accuracy of subsequent brightness compensation for the first sub-pixel 1. In addition, the embodiments of the present disclosure can achieve temperature detection only by adding one or more transistors to form the detector 5 in the first pixel circuit 2. The transistor occupies small area and has a small impact on light transmittance. Therefore, compared with the related art, the embodiment of the present disclosure can help improve a pixel density of the display panel or optimize a structural design of a transparent display panel.

Figure 6:
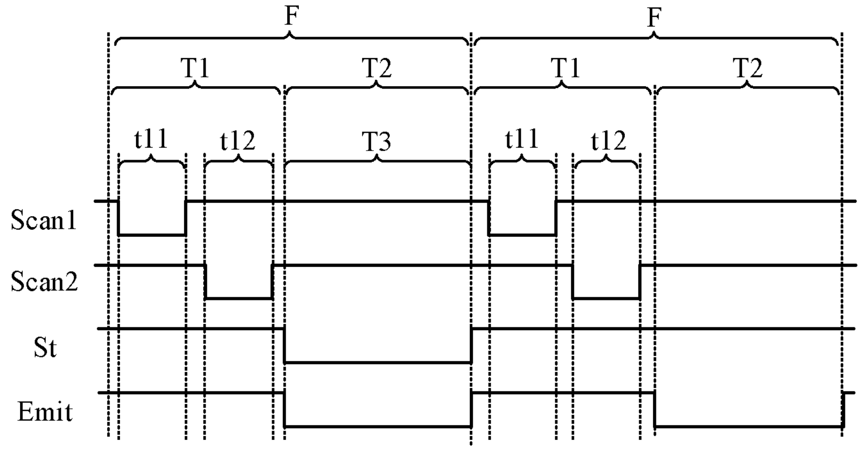
FIG. 6 is an operating sequence diagram of a first pixel circuit according to an embodiment of the present disclosure.

FIG. 6 is an operating sequence diagram of a first pixel circuit 2 according to an embodiment of the present disclosure. In some embodiments of the present disclosure, as shown in FIG. 6, within a time period F of one frame of image of the display panel, an operating process of the first pixel circuit 2 includes a preposition stage T1 and a light-emitting stage T2. During at least one frame of image, the light-emitting stage T2 includes a detection stage T3. In the detection stage T3, the display controller 4 provides a driving current for the first light-emitting element 3, and the detector 5 is turned on to detect the voltage of the first electrode of the first light-emitting element 3.

In the above setting manner, in the detection stage T3, the driving current required by the first light-emitting element 3 is provided by the display controller 4, and the detector 5 is only configured to collect the voltage of the first electrode of the first light-emitting element 3. In this manner, functions of the display controller 4 and the detector 5 are independent of each other. The detector 5 only collects the voltage, achieving a simple design of the detector 5.

In different detection stages T3, the display controller 4 can provide a same driving current for the first light-emitting element 3. This allows the voltage collected by the detector 5 to be a voltage on the first electrode of the first light-emitting element 3 when the first light-emitting element 3 receives the same driving currents. In this way, a driving chip only needs to pre-store a mapping relationship between a temperature and a forward voltage drop that corresponds to this driving current, and does not need to store a mapping relationship between a temperature and a forward voltage drop that corresponds to each driving current, thereby storing a smaller amount of data.

In addition, when the first light-emitting element 3 receives the same driving current in different detection stages T3, if the display panel displays a static image and a driving current corresponding to the static image is equal to a driving current required for detection, the light-emitting stage T2 of each frame of image can include the detection stage T3. If a driving current corresponding to an image to be displayed by the display panel is different from the driving current required for the detection, for example, when the display panel needs to display a dynamic image, only light-emitting stages T2 of some frames of the image can include the detection stage T3, while light-emitting stages T2 of other frames of the image do not include the detection stage T3, that is, a detection image is interspersed between display images, so that normal display is achieved while achieving a detection function.

Further, referring to FIG. 6, a duration of the detection stage T3 can be set to be equal to a duration of the light-emitting stage T2. In this way, throughout an entire time period of receiving the driving current by the first light-emitting element 3, the detector 5 continuously collects the voltage of the first electrode of the first light-emitting element 3 for a long time, so that the collected voltage is more accurate.

Figure 7:
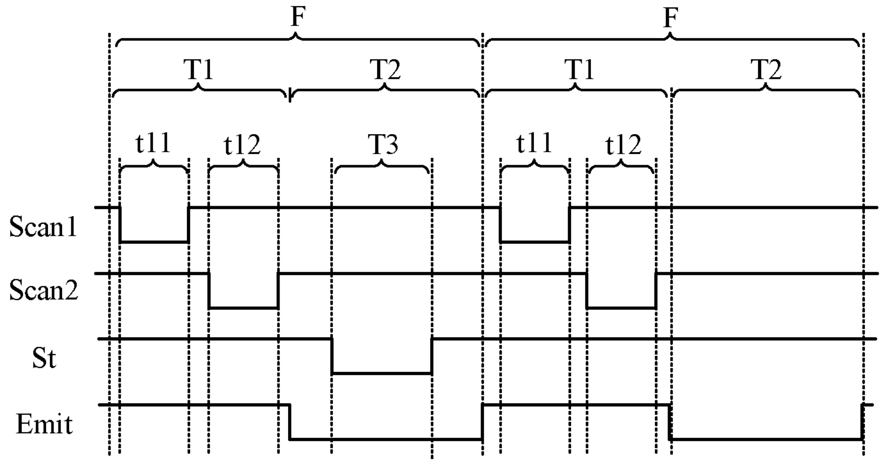
FIG. 7 is an operating sequence diagram of a first pixel circuit according to another embodiment of the present disclosure.

In some embodiments of the present disclosure, as shown in FIG. 7, FIG. 7 is an operating sequence diagram of the first pixel circuit 2 according to another embodiment of the present disclosure. The duration of the detection stage T3 can be smaller than the duration of the light-emitting stage T2.

As mentioned above, in the detection stage T3, the driving current required by the first light-emitting element 3 is provided by the display controller 4. A structure of the display controller 4 shown in FIG. 4 is taken as an example below to explain an operating principle of providing the driving current to the first light-emitting element 3 by the display controller 4.

Referring to FIG. 4, the display controller 4 can include a driving unit 6, a gate resetting unit 7, a charging unit 8, a positive electrode resetting unit 9, a light-emitting control unit 10, and a storage capacitor Cst.

The driving unit 6 can include a driving transistor M0.

The gate resetting unit 7 can include a gate reset transistor M1. A gate of the gate reset transistor M1 is electrically connected to a first scan signal line Scan1, a first electrode of the gate reset transistor M1 is electrically connected to a reset signal line Vref, and a second electrode of the gate reset transistor M1 is electrically connected to a gate of the driving transistor M0.

The charging unit 8 can include a data writing transistor M2 and a compensation transistor M3. A gate of the data writing transistor M2 and a gate of the compensation transistor M3 are electrically connected to a second scan signal line Scan2, respectively. A first electrode of the data writing transistor M2 is electrically connected to a data line Data, and a second electrode of the data writing transistor M2 is electrically connected to a first electrode of the driving transistor M0. A first electrode of the compensation transistor M3 is electrically connected to a second electrode of the driving transistor M0, and a second electrode of the compensation transistor M3 is electrically connected to the gate of the driving transistor M0.

The positive electrode resetting unit 9 can include an anode resetting transistor M4. A gate of the anode resetting transistor M4 is electrically connected to the second scan signal line Scan2, a first electrode of the anode resetting transistor M4 is electrically connected to the reset signal line Vref, and a second electrode of the anode resetting transistor M4 is electrically connected to the first electrode of the first light-emitting element 3.

The light-emitting control unit 10 can include a first light-emitting control transistor M5 and a second light-emitting control transistor M6. A gate of the first light-emitting control transistor M5 and a gate of the second light-emitting control transistor M6 are electrically connected to a light-emitting control signal line Emit, respectively. A first gate of the first light-emitting control transistor M5 is electrically connected to a power signal line PVDD, and a second electrode of the first light-emitting control transistor M5 is electrically connected to the first electrode of the driving transistor M0. A first electrode of the second light-emitting control transistor M6 is electrically connected to the second electrode of the driving transistor M0, and a second electrode of the second light-emitting control transistor M6 is electrically connected to the first electrode of the first light-emitting element 3.

A first plate of the storage capacitor Cst is electrically connected to the power signal line PVDD, and a second plate of the storage capacitor Cst is electrically connected to the gate of the driving transistor M0.

Based on the above structure, referring to FIG. 6, the preposition stage T1 can include a resetting stage t11 and a data writing stage t12.

In the resetting stage t11, the first scan signal line Scan1 provides an enabling level to control the gate resetting unit 7 to be turned on, and the gate resetting unit 7 resets the gate of the driving transistor M0. The gate reset transistor M1 is turned on under the action of the enabling level provided by the first scan signal line Scan1, to write a resetting voltage provided by the reset signal line Vref into the gate of the driving transistor M0.

In the data writing stage t12, the second scan signal line Scan2 provides an enabling level to control the charging unit 8 and the positive electrode resetting unit 9 to be turned on, such that the charging unit 8 charges the gate of the driving transistor M0 and the positive electrode resetting unit 9 resets the positive electrode of the first light-emitting element 3. In an embodiment, the data writing transistor M2 and the compensation transistor M3 are turned on under the action of the enabling level provided by the second scan signal line Scan2, to write a data voltage provided by the data line into the gate of the driving transistor M0, and to perform threshold compensation for the driving transistor M0. The anode resetting transistor M4 is turned on under the action of the enabling level provided by the second scan signal line Scan2, to write the resetting voltage provided by the reset signal line Vref into the positive electrode of the first light-emitting element 3.

In the light-emitting stage T2, the light-emitting control signal line Emit provides an enabling level to control the light-emitting control unit 10 to be turned on, such that the light-emitting control unit 10 writes a driving current converted by the driving unit 6 into the first electrode of the first light-emitting element 3 to drive the first light-emitting element 3 to emit light. The first light-emitting control transistor M5 and the second light-emitting control transistor M6 are turned on under the action of the enabling level provided by the light-emitting control signal line Emit, to write a driving current converted by the driving transistor M0 into the first electrode of the first light-emitting element 3.

In the detection stage T3 within the light-emitting stage T2, when the first electrode of the first light-emitting element 3 receives the driving current, the detector 5 is turned on to collect the voltage of the first electrode of the first light-emitting element 3.

When the transistors in the first pixel circuit 2 are P-type transistors, the enabling levels provided by the above signal lines are low levels. When the transistors in the first pixel circuit 2 are N-type transistors, the enabling levels provided by the above signal lines are high levels. The embodiments of the present disclosure are illustrated by using an example in which the transistors in the first pixel circuit 2 are P-type transistors and the enabling levels are low levels.

Figure 8:
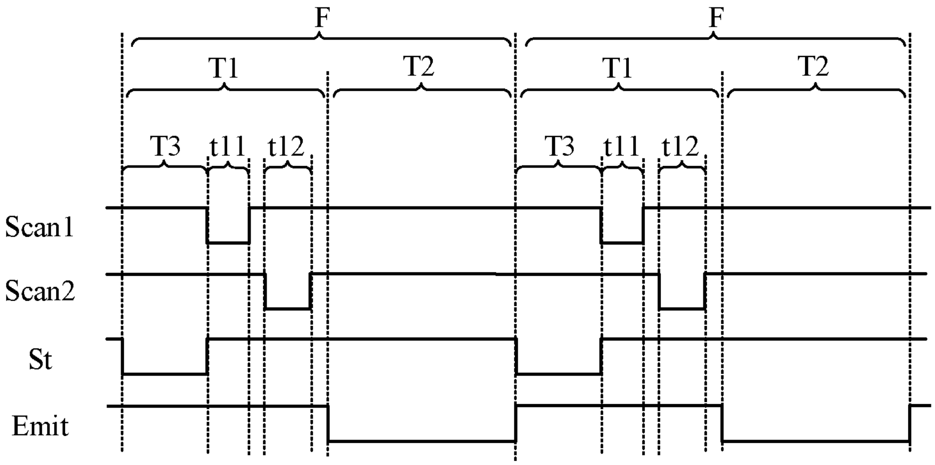
FIG. 8 is an operating sequence diagram of a first pixel circuit according to another embodiment of the present disclosure.
Figure 9:
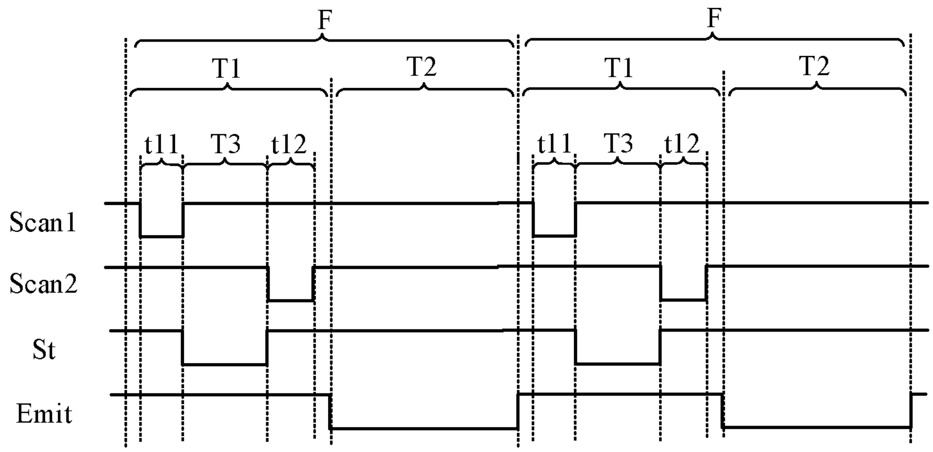
FIG. 9 is an operating sequence diagram of a first pixel circuit according to another embodiment of the present disclosure.
Figure 10:
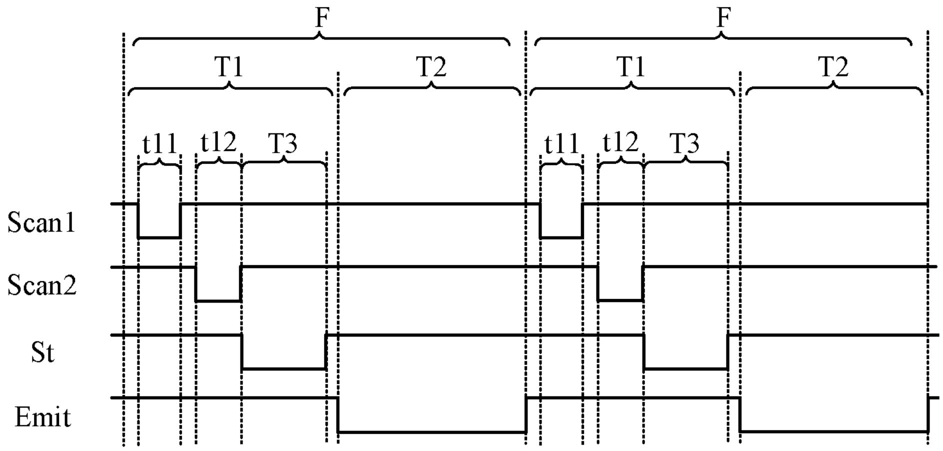
FIG. 10 is an operating sequence diagram of a first pixel circuit according to another embodiment of the present disclosure.

In some embodiments of the present disclosure, referring to FIG. 8 to FIG. 10, during a time period F of one frame of image of the display panel, the operating process of the first pixel circuit 2 includes a preposition stage T1 and a light-emitting stage T2. During at least one frame of image, the preposition stage T1 includes a detection stage T3. In the detection stage T3, the detector 5 is turned on to provide a driving current for the first light-emitting element 3 and detect the voltage of the first electrode of the first light-emitting element 3.

In this manner, the driving current required by the first light-emitting element 3 in the detection stage T3 is provided by the detector 5. In a feasible setting manner, one end of the detector 5 is connected to the first electrode of the first light-emitting element 3, and the other end of the detector 5 is connected to a port for providing the driving current and another port for receiving a detection voltage in the driving chip. In the detection stage T3, the detector 5 is turned on, and the driving chip applies the driving current to the detector 5. The detector 5 transmits the driving current to the first light-emitting element 3. At the same time, the detector 5 collects the voltage of the first electrode of the first light-emitting element 3.

In the above manner, the detection is carried out in the preposition stage T1, so that the detection process does not affect the normal display. For example, as mentioned above, in different detection stages T3, the first light-emitting element 3 can receive the same driving current. In the above manner, regardless of whether the display panel displays the static image or the dynamic image, the driving current required for the display can be provided for the first light-emitting element 3 in the light-emitting stage T2 of each frame of image to turn on the first light-emitting element 3 to perform the normal display, provided that the driving current required for the detection for the first light-emitting element 3 is provided by the detector 5 in the preposition stages T1 of some frames of image or in the preposition stage T1 of each frame of image.

In some embodiments of the present disclosure, the display controller 4 includes a gate resetting unit 7, a charging unit 8, and a driving unit 6. The driving unit 6 includes a driving transistor M0. The preposition stage T1 further includes a resetting stage t11 and a data writing stage t12 subsequent to the resetting stage tn. In the resetting stage t11, the gate resetting unit 7 is turned on to reset the gate of the driving transistor M0. In the data writing stage t12, the charging unit 8 is turned on to write the data voltage into the gate of the driving transistor M0.

Structures of the gate resetting unit 7 and the charging unit 8, and operating principles of the display controller 4 in the resetting stage t11 and the data writing stage t12 have been explained in the above embodiments. Details are not elaborated herein again.

In some embodiments of the present disclosure, referring to FIG. 8 to FIG. 10, the detection stage T3 does not overlap with the resetting stage t11 or the data writing stage t12.

In a setting manner, referring to FIG. 4, the detector 5 includes a detection transistor Mt. A gate of the detection transistor Mt is electrically connected to a control signal line St, a first electrode of the detection transistor Mt is electrically connected to a detection signal line Vt, and a second electrode of the detection transistor Mt is electrically connected to the first light-emitting element 3. Taking the transistors being P-type transistors as an example, the expression of "the detection stage T3 does not overlap with the resetting stage t11 or the data writing stage t12" means that a low level provided by the control signal line St does not overlap with a low level provided by the first scan signal line Scan1 or a low level provided by the second scan signal line Scan2.

In this setting manner, the detection stage T3 is independent of the resetting stage t11 and the data writing stage t12, and operating processes of the detector 5 and the display controller 4 are staggered. For example, the detection stage T3 can be prior to the resetting stage t11, subsequent to the data writing stage t12, or between the resetting stage t11 and the data writing stage t12.

FIG. 8 is an operating sequence diagram of the first pixel circuit 2 according to another embodiment of the present disclosure. Further, as shown in FIG. 8, the detection stage T3 is prior to the resetting stage t11. The gate resetting unit 7 is turned on to enter the resetting stage t11 at the end of the detection stage T3.

Taking the transistors being P-type transistors as an example, the expression of "the gate resetting unit 7 is turned on to enter the resetting stage t11 at the end of the detection stage T3" means that when a control signal provided by the control signal line St jumps from a low level to a high level, a first scan signal provided by the first scan signal line Scan1 jumps from a high level to a low level, to control the gate reset transistor M1 to be turned on to enter the resetting stage t11.

FIG. 9 is an operating sequence diagram of the first pixel circuit 2 according to another embodiment of the present disclosure. Alternatively, as shown in FIG. 9, the detection stage T3 is located between the resetting stage t11 and the data writing stage t12. The detector 5 is turned on to enter the detection stage T3 at the end of the resetting stage t11, and the charging unit 8 is turned on to enter the data writing stage t12 at the end of the detection stage T3.

Taking the transistors being P-type transistors as an example, the expression of "the detector 5 is turned on to enter the detection stage T3 at the end of the resetting stage t11, and the charging unit 8 is turned on to enter the data writing stage t12 at the end of the detection stage T3" means that: when a first scan signal provided by the first scan signal line Scan1 jumps from a low level to a high level, a control signal provided by the control signal line St jumps from a high level to a low level, to control the detection transistor Mt to be turned on to enter the detection stage T3; and when the control signal subsequently jumps from the low level to the high level, a second scan signal provided by the second scan signal line Scan2 jumps from a high level to a low level, and the data writing transistor M2 and the compensation transistor M3 are turned on to enter the data writing stage t12.

FIG. 10 is an operating sequence diagram of the first pixel circuit 2 according to another embodiment of the present disclosure. Alternatively, as shown in FIG. 10, the detection stage T3 is subsequent to the data writing stage t12. The detector 5 is turned on to enter the detection stage T3 at the end of the data writing stage t12.

Taking the transistors being P-type transistors as an example, the expression of "the detector 5 is turned on to enter the detection stage T3 at the end of the data writing stage t12" means that when a second scan signal provided by the second scan signal line Scan2 jumps from a high level to a low level, a control signal provided by the control signal line St jumps from a high level to a low level, to control the detection transistor Mt to be turned on to enter the detection stage T3.

According to the above manner, there is no interval between the detection stage T3 and its adjacent resetting stage t11 and/or data writing stage t12, so that overall duration of the preposition stage can be shortened, and a time proportion of the light-emitting stage T2 can be increased, thereby improving brightness of the first light-emitting element 3, and thus achieving high-frequency display.

Figure 11:
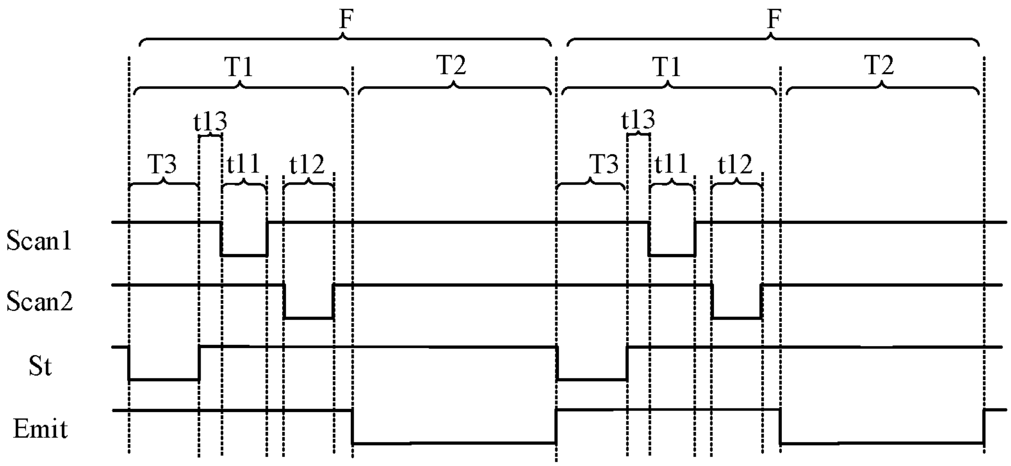
FIG. 11 is an operating sequence diagram of a first pixel circuit according to another embodiment of the present disclosure.
Figure 12:
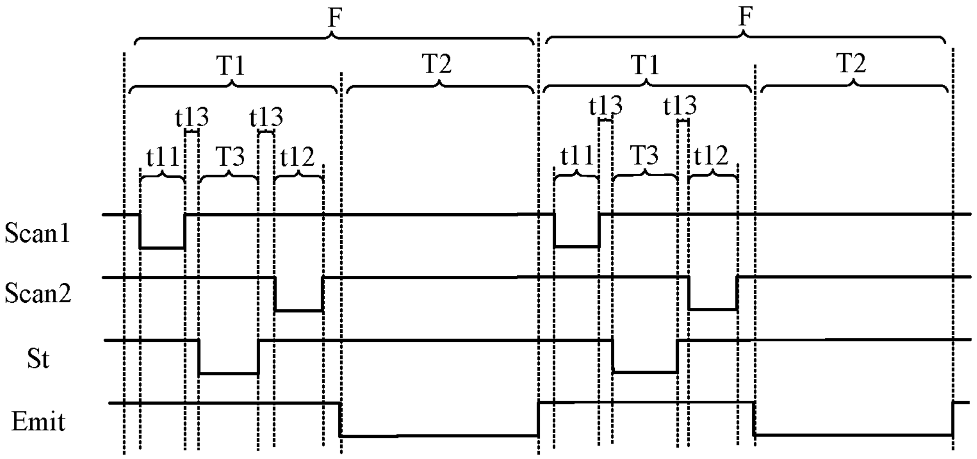
FIG. 12 is an operating sequence diagram of a first pixel circuit according to another embodiment of the present disclosure.
Figure 13:
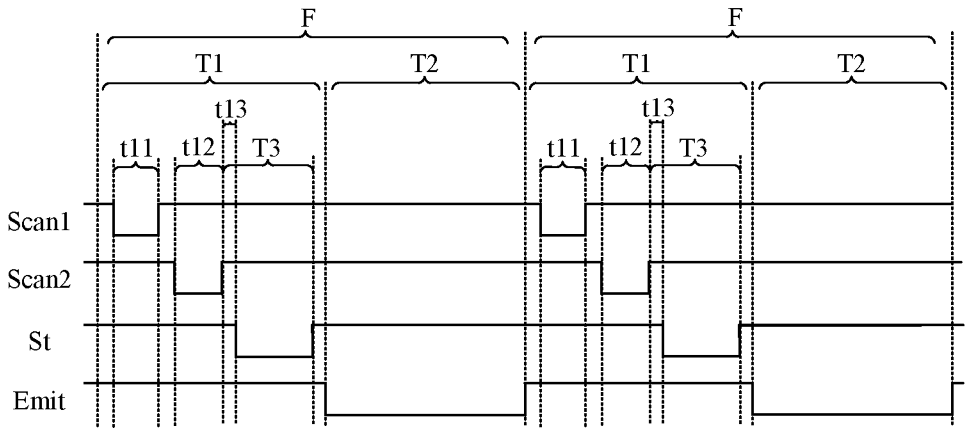
FIG. 13 is an operating sequence diagram of a first pixel circuit according to another embodiment of the present disclosure.

FIG. 11 is an operating sequence diagram of the first pixel circuit 2 according to another embodiment of the present disclosure, FIG. 12 is an operating sequence diagram of the first pixel circuit 2 according to another embodiment of the present disclosure, and FIG. 13 is an operating sequence diagram of the first pixel circuit 2 according to another embodiment of the present disclosure. In some embodiments of the present disclosure, as shown in FIG. 11 to FIG. 13, there can be a second interval stage t13 between the detection stage T3 and its adjacent resetting stage t11 and/or data writing stage t12. In the second interval stage t13, the first scan signal line Scan1, the second scan signal line Scan2, and the control signal line St each provide a non-enabling level (high level).

Further, since the second interval stage t13 is only used as a transitional stage and does not have any practical effect, duration of the second interval stage t13 can be set to be smaller than duration of the resetting stage t11, duration of the data writing stage t12, and the duration of the detection stage T3. Therefore, firstly, overall duration of the preposition stage T1 is shortened, secondly, more time is allocated to the detection stage T3 under the same duration of the preposition stage T1.

Figure 14:
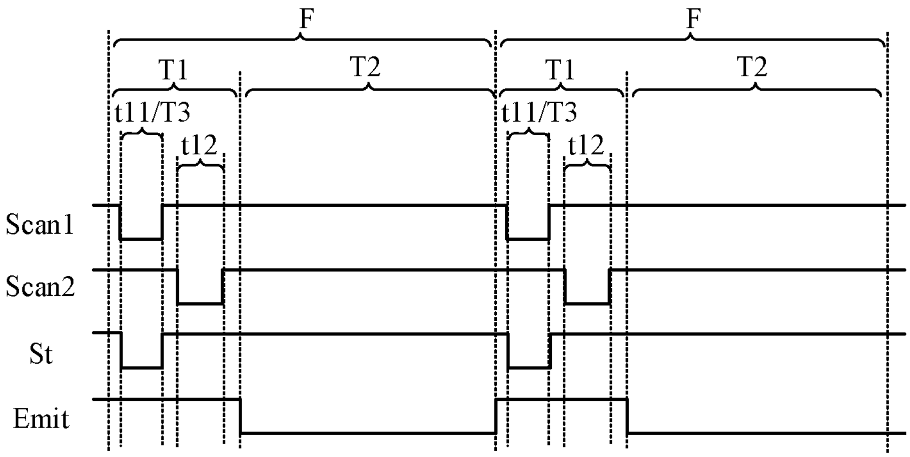
FIG. 14 is an operating sequence diagram of a first pixel circuit according to another embodiment of the present disclosure.
Figure 15:
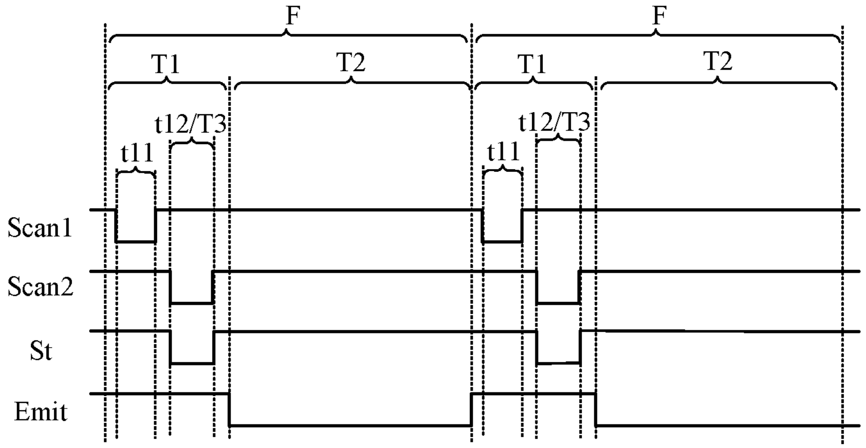
FIG. 15 is an operating sequence diagram of a first pixel circuit according to another embodiment of the present disclosure.
Figure 16:
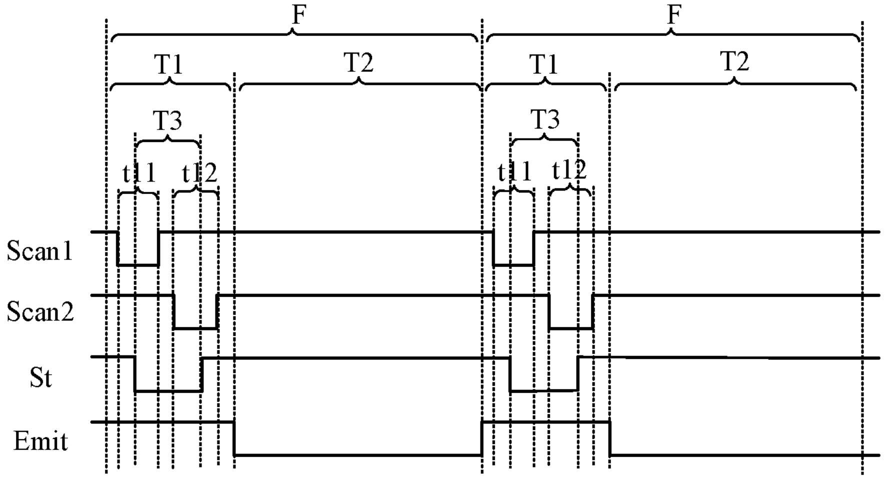
FIG. 16 is an operating sequence diagram of a first pixel circuit according to another embodiment of the present disclosure.

In a feasible setting manner, referring to FIG. 14 to FIG. 16, a time period of the detection stage T3 overlaps at least partially with a time period of the resetting stage t11, and/or, a time period of the detection stage T3 overlaps at least partially with a time period of the data writing stage t12.

FIG. 14 is an operating sequence diagram of the first pixel circuit 2 according to another embodiment of the present disclosure. For example, as shown in FIG. 14, the time period of the detection stage T3 overlaps at least partially with the time period of the resetting stage t11, and the detection stage T3 does not overlap with the data writing stage t12. That is, the enabling level (low level) provided by the control signal line St overlaps with the enabling level (low level) provided by the first scan signal line Scan1, and does not overlap with the enabling level (low level) provided by the second scan signal line Scan2.

FIG. 15 is an operating sequence diagram of the first pixel circuit 2 according to another embodiment of the present disclosure. Alternatively, as shown in FIG. 15, the time period of the detection stage T3 overlaps at least partially with the time period of the data writing stage t12, and the detection stage T3 does not overlap with the resetting stage t11. That is, the enabling level (low level) provided by the control signal line St overlaps with the enabling level (low level) provided by the second scan signal line Scan2, and does not overlap with the enabling level (low level) provided by the first scan signal line Scan1.

FIG. 16 is an operating sequence diagram of the first pixel circuit 2 according to another embodiment of the present disclosure. Alternatively, as shown in FIG. 16, the time period of the detection stage T3 overlaps at least partially with both the time period of the resetting stage t11 and the time period of the data writing stage t12. That is, the enabling level (low level) provided by the control signal line St overlaps with both the enabling level (low level) provided by the first scan signal line Scan1 and the enabling level (low level) provided by the second scan signal line Scan2.

In the above setting manner, the detection stage T3 can overlap with the resetting stage t11 and/or the data writing stage t12. In this case, the preposition stage T1 does not need to be lengthened to cover the detection stage T3, so that the overall duration of the preposition stage T1 can be shortened, and the time proportion of the light-emitting stage T2 is increased, thereby improving the brightness of the first light-emitting element 3, and achieving the high-frequency display.

Figure 17:
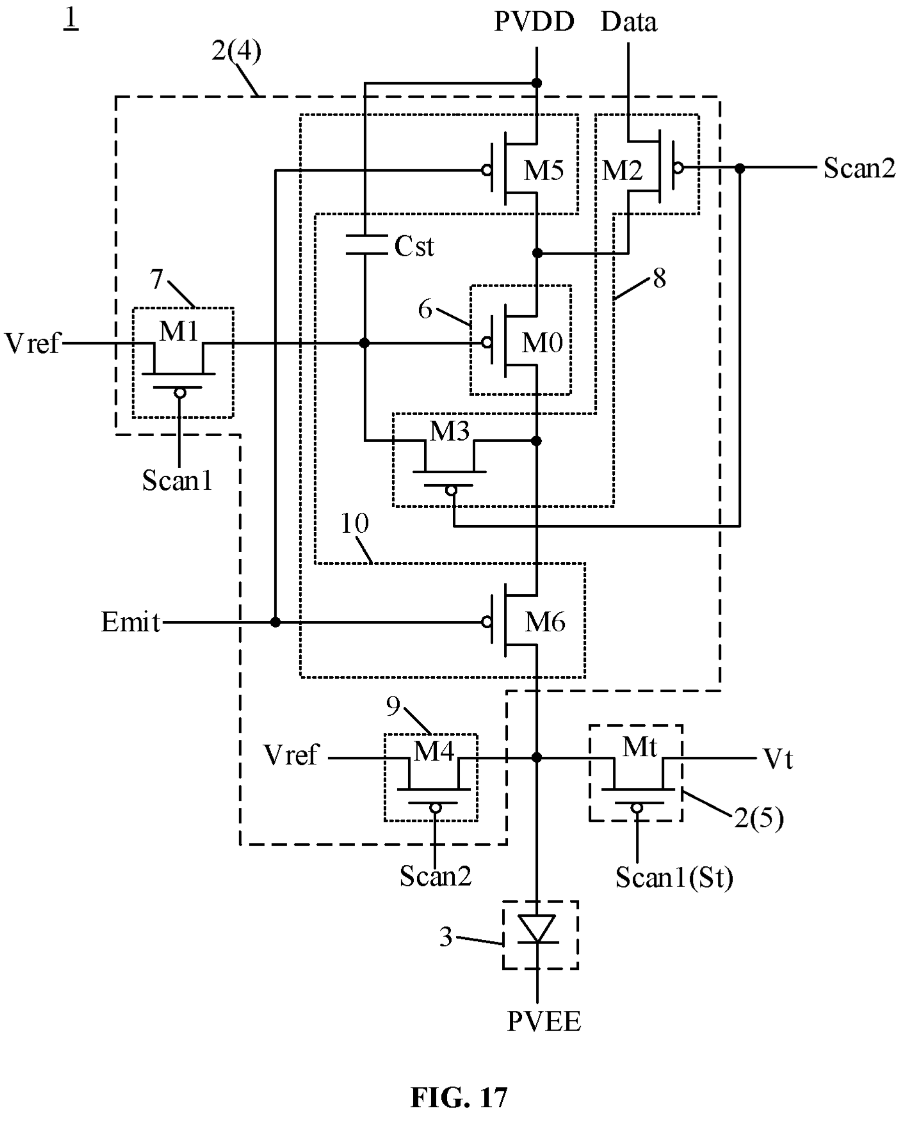
FIG. 17 is a structural schematic diagram of a first sub-pixel according to another embodiment of the present disclosure.

Further, referring to FIG. 14 and FIG. 17, FIG. 17 is a structural schematic diagram of the first sub-pixel 1 according to another embodiment of the present disclosure. The detector 5 is electrically connected to the control signal line St, and is turned on in response to the control signal provided by the control signal line St. The gate resetting unit 7 is electrically connected to the first scan signal line Scan1, and is turned on in response to the first scan signal provided by the first scan signal line Scan1.

The detection stage T3 overlaps with the resetting stage t11, and the control signal line St is reused as the first scan signal line Scan1. This setting can reduce the number of signal lines disposed in the display panel. This can release more space to dispose more sub-pixels to further improve the pixel density of the display panel, or release more transparent area to increase the light transmittance of the display panel.

Figure 18:
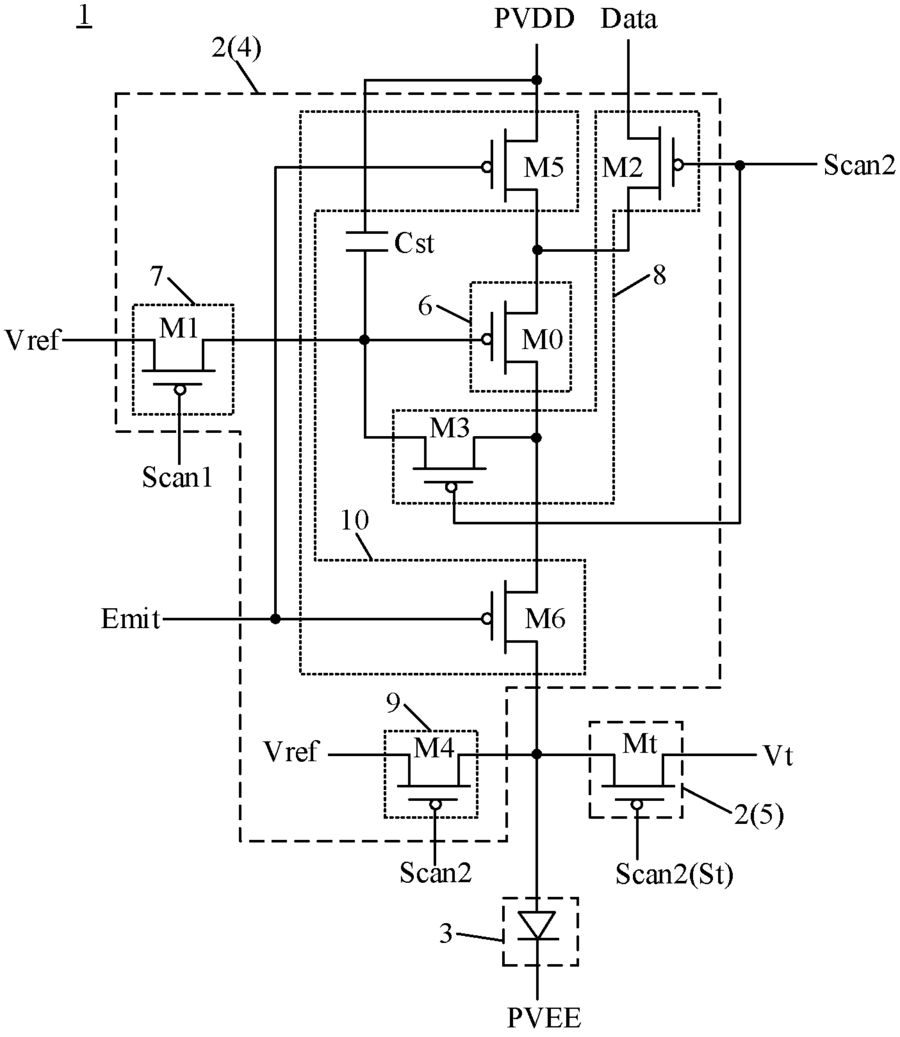
FIG. 18 is a structural schematic diagram of a first sub-pixel according to another embodiment of the present disclosure.

FIG. 18 is a structural schematic diagram of the first sub-pixel 1 according to another embodiment of the present disclosure. Alternatively, referring to FIG. 15 and FIG. 18, the detector 5 is electrically connected to the control signal line St, and is turned on in response to the control signal provided by the control signal line St. The charging unit 8 is electrically connected to the second scan signal line Scan2, and is turned on in response to the second scan signal provided by the second scan signal line Scan2.

The detection stage T3 overlaps with the data writing stage t12, and the control signal line St is reused as the second scan signal line Scan2. This setting can reduce the number of signal lines disposed in the display panel to further improve the pixel density of the display panel or the light transmittance of the display panel.

Figure 19:
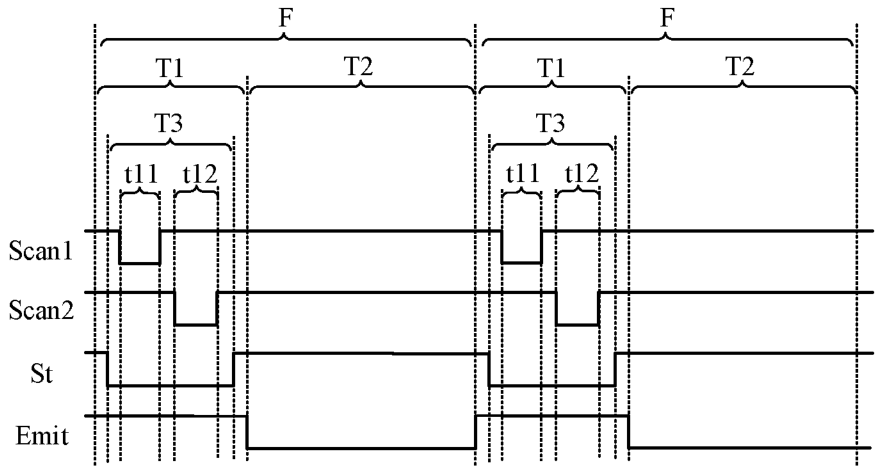
FIG. 19 is an operating sequence diagram of a first pixel circuit according to another embodiment of the present disclosure.

FIG. 19 is an operating sequence diagram of the first pixel circuit 2 according to another embodiment of the present disclosure. In some embodiments of the present disclosure, as shown in FIG. 19, the gate resetting unit 7 is turned on to enter the resetting stage t11 after entering the detection stage T3, and the charging unit 8 is turned on to enter the data writing stage t12 before the end of the detection stage T3.

Taking the transistors being P-type transistors as an example, the expression of "the gate resetting unit 7 is turned on to enter the resetting stage t11 after entering the detection stage T3, and the charging unit 8 is turned on to enter the data writing stage t12 before the end of the detection stage T3" means that: after the control signal provided by the control signal line St jumps from the high level to the low level, the first scan signal provided by the first scan signal line Scan1 starts to jump from the high level to the low level again to control the gate reset transistor M1 to be turned on to enter the resetting stage t11; after the first scan signal jumps from the low level to the high level, the second scan signal provided by the second scan signal line Scan2 jumps from the high level to the low level, the data writing transistor M2 and the compensation transistor M3 are turned on to enter the data writing stage t12; and finally, after the second scan signal jumps from the low level to the high level, a detection signal starts to jump from a low level to a high level again, and the detection stage T3 ends.

In the above setting manner, the detection stage T3 covers the resetting stage t11 and the data writing stage t12. Therefore, the detection stage T3 has longer duration, and the detector 5 has longer collection time, achieving a more accurate voltage data collected.

In some embodiments of the present disclosure, as shown in FIG. 8 to FIG. 13, FIG. 16, and FIG. 19, the duration of the detection stage T3 can be set to be greater than the duration of the resetting stage t11 and the duration of the data writing stage t12, so that the detector 5 has sufficient collection time, thereby improving accuracy of collected voltage data.

Figure 20:
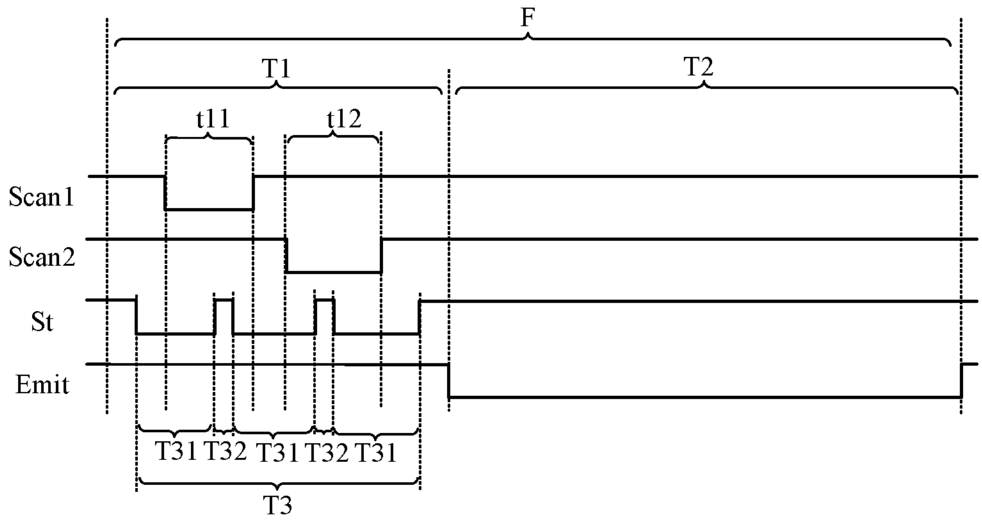
FIG. 20 is an operating sequence diagram of a first pixel circuit according to another embodiment of the present disclosure.

FIG. 20 is an operating sequence diagram of the first pixel circuit 2 according to another embodiment of the present disclosure. In some embodiments of the present disclosure, as shown in FIG. 20, the detection stage T3 includes at least two sub-stages T31, and there is a first interval stage T32 between two adjacent sub-stages T31. In the sub-stage T31, the detector 5 is turned on to provide the driving current for the first light-emitting element 3 and detect the voltage of the first electrode of the first light-emitting element 3.

In this manner, the detection stage T3 can be divided into multiple sub-stages T31. Throughout the entire detection stage T3, the voltage of the first electrode of the first light-emitting element 3 is collected multiple times, and then whether the voltage changes is determined based on multiple collection results. If the collection results are the same, it indicates that the current temperature of the first light-emitting element 3 is relatively stable. Subsequently, the current temperature of the first light-emitting element 3 can be directly obtained based on the same voltage. If the collection results are different, it indicates that the current temperature of the first light-emitting element 3 is changing in real time. In this case, the current temperature of the first light-emitting element 3 can be obtained based on a voltage collected in a last sub-stage T31, such that the obtained temperature is closer to a temperature when the first sub-pixel 1 is compensated.

Further, referring to FIG. 20, because the first interval stage T32 serves only as a transitional stage and does not have any practical effect, duration of the first interval stage T32 can be set to be smaller than duration of the sub-stage T31. On the one hand, it can allocate more duration to the sub-stage T31 to increase collection time of the detector 5. On the other hand, it can avoid excessively long overall time of the detection stage T3, further avoiding lengthening the preposition stage T1 for the purpose of covering the detection stage T3 by the preposition stage T1.

In addition, in some embodiments of the present disclosure, different sub-stages T31 can have same duration to improve uniformity of the collection time of the detector 5 in different sub-stages T31.

Figure 21:
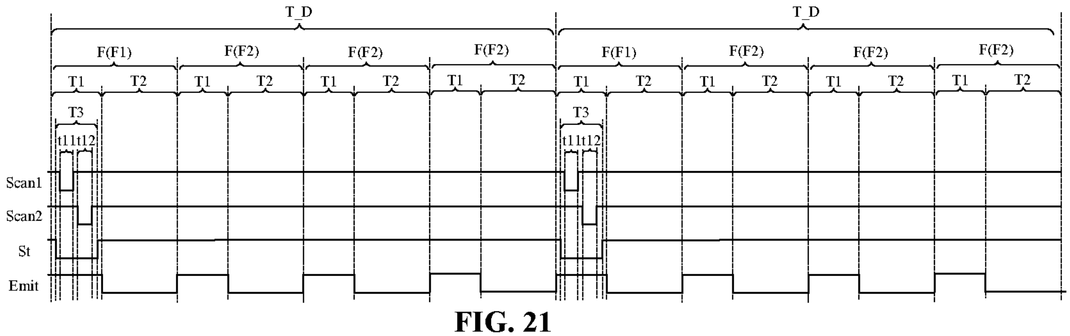
FIG. 21 is an operating sequence diagram of a first pixel circuit according to another embodiment of the present disclosure.

FIG. 21 is an operating sequence diagram of the first pixel circuit 2 according to another embodiment of the present disclosure. In some embodiments of the present disclosure, referring to FIG. 4 and FIG. 21, the display controller 4 includes a charging unit 8 and a driving unit 6. The driving unit 6 includes a driving transistor M0.

One data refreshing cycle T_D of the display panel includes time of S frames of image, and S>1. The data refreshing cycle T_D includes a writing frame F1 and a holding frame F2. The writing frame F1 includes the data writing stage t12, and the holding frame F2 does not include the data writing stage t12. In the data writing stage t12, the charging unit 8 is turned on to write the data voltage into the gate of the driving transistor M0.

At least some of writing frames F1 include the detection stage T3.

When the display panel is driven at a low frequency, in order to reduce flickering, the data refreshing cycle T_D of the display panel can be divided into the writing frame F1 and the holding frame F2. The writing frame F1 includes the data writing stage t12 to perform a data refreshing operation on the display panel. In the holding frame F2, data written in the writing frame F1 is continuously used, and no data is written again. In this driving manner, the detection stage T3 can be set in at least some writing frames F1. In this case, the control signal line St can be designed more diversely. For example, in a design, the control signal line St is not reused as the second scan signal line Scan2, and the detection stage T3 can partially overlap or not overlap with the data writing stage t12 of the writing frame F1. In another design, the control signal line St can be reused as the second scan signal line Scan2. In this case, the detection stage T3 overlaps with the data writing stage t12 of the writing frame F1.

Figure 22:
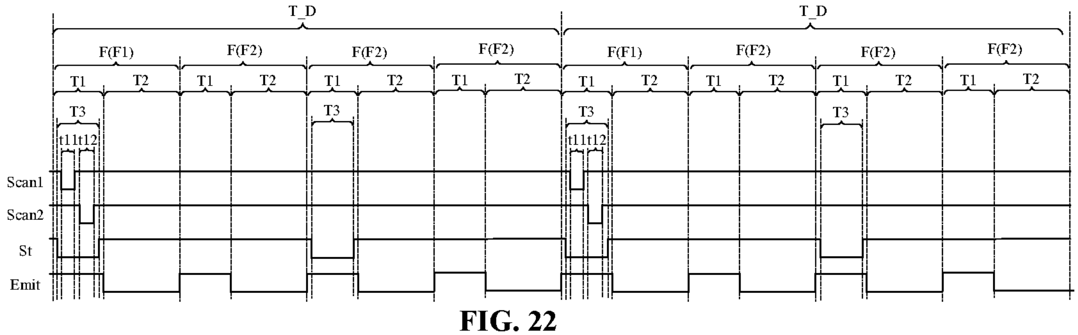
FIG. 22 is an operating sequence diagram of a first pixel circuit according to another embodiment of the present disclosure.

FIG. 22 is an operating sequence diagram of the first pixel circuit 2 according to another embodiment of the present disclosure. Further, as shown in FIG. 22, at least one holding frame F2 includes a detection stage T3.

When the holding frame F2 further includes the detection stage T3, a voltage collection frequency of the detector 5 can be flexibly adjusted. For example, the voltage collection frequency of the detector 5 can be set to be greater than a data refreshing frequency. For example, referring to FIG. 22, when one data refreshing cycle T_D includes one writing frame F1 and three holding frames F2, assuming that the writing frame F1 of each data refreshing cycle T_D includes the detection stage 3, and one holding frame F2 of each data refreshing cycle T_D further includes the detection stage T3, the voltage collection frequency of the detector 5 can be set to twice as much as the data refreshing frequency. Such a manner is particularly suitable for low-frequency driving with a low data refreshing frequency. A temperature change of the first light-emitting element 3 can be monitored in real time by increasing a detection frequency, thereby providing more accurate brightness compensation for the first sub-pixel 1.

Figure 23:
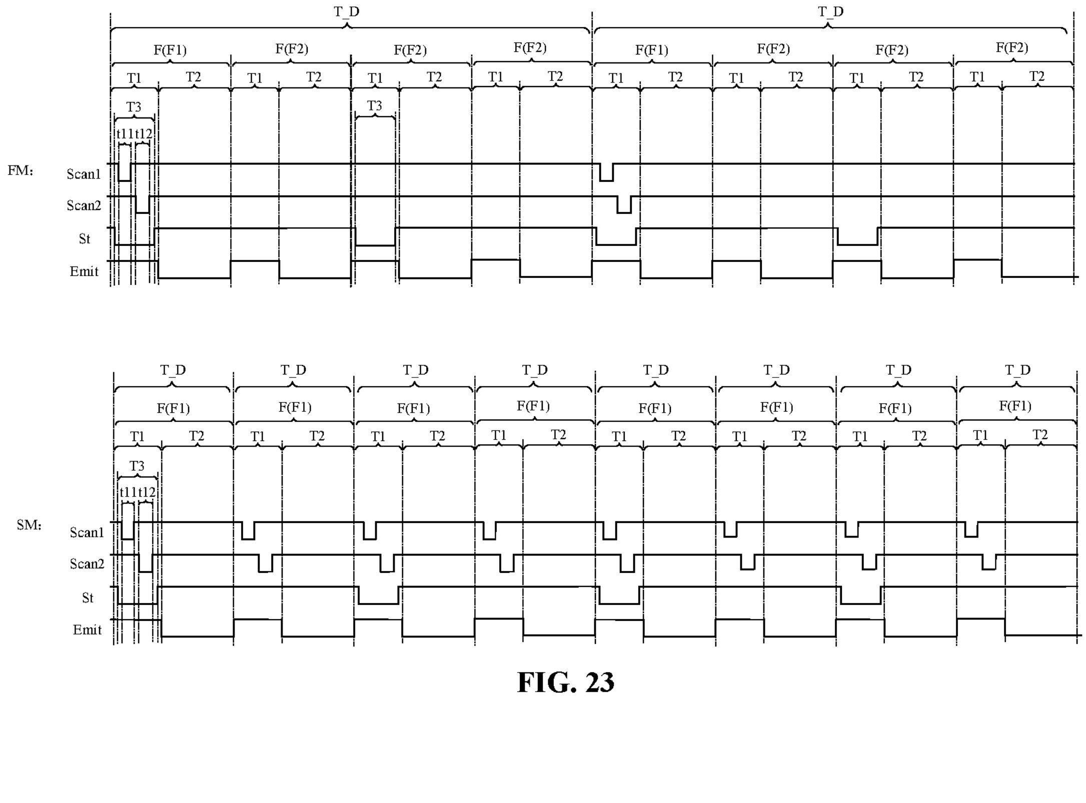
FIG. 23 is an operating sequence diagram of a first pixel circuit according to another embodiment of the present disclosure.

FIG. 23 is an operating sequence diagram of the first pixel circuit 2 according to another embodiment of the present disclosure. In some embodiments of the present disclosure, as shown in FIG. 23, the display panel has a first mode FM and a second mode SM. The first mode FM includes a first data refreshing frequency, the second mode SM includes a second data refreshing frequency, and the first data refreshing frequency is smaller than or equal to the second data refreshing frequency.

A frequency at which the detector 5 detects the voltage of the first electrode of the first light-emitting element 3 is greater than or equal to the first data refreshing frequency, and smaller than or equal to the second data refreshing frequency.

The above first mode FM can be understood as a low-frequency driving mode, and the second mode SM can be understood as a high-frequency driving mode. The second data refreshing frequency under the second mode SM can be a maximum data refreshing frequency possessed by the display panel, in other words, can be understood as a fundamental frequency of the display panel. For example, the first data refreshing frequency is 30 Hz, the second data refreshing frequency is 240 Hz, and the frequency at which the detector 5 detects the voltage of the first electrode of the first light-emitting element 3 can be 30 Hz, 60 Hz, 120 Hz, 240 Hz, or the like.

An excessively low detection frequency can be avoided by setting the detection frequency to be greater than or equal to the first data refreshing frequency and smaller than or equal to the second data refreshing frequency. This can further achieve real-time collection of the voltage of the first electrode of the first light-emitting element 3, and real-time determining of the current temperature of the first light-emitting element 3, to accurately obtain the temperature change of the first light-emitting element 3.

Figure 24:
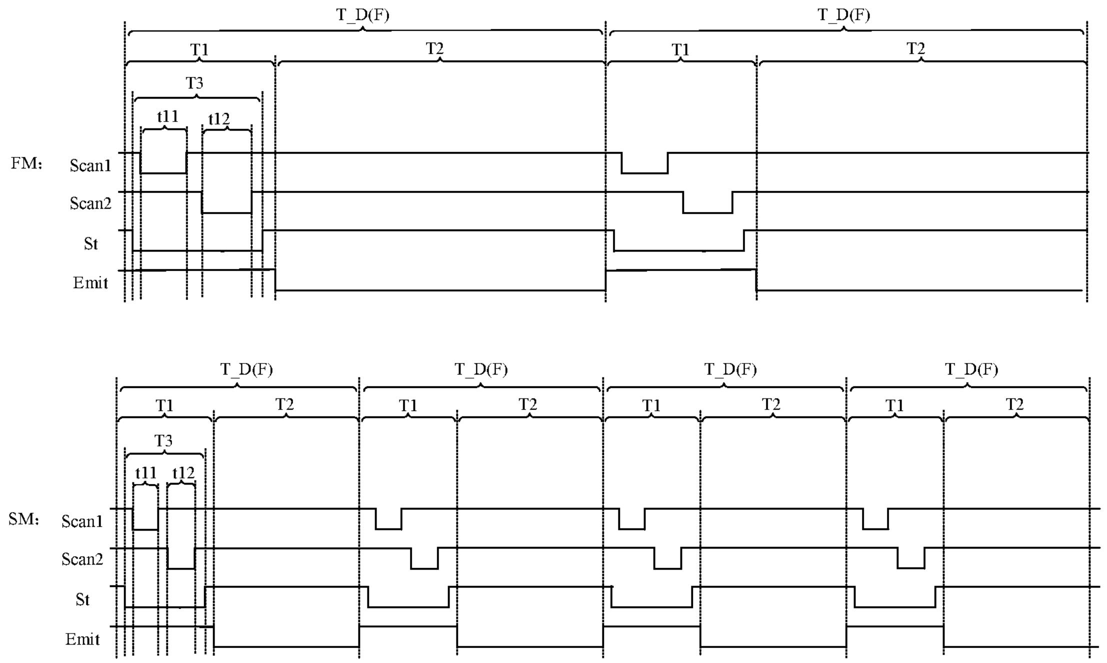
FIG. 24 is an operating sequence diagram of a first pixel circuit according to another embodiment of the present disclosure.

FIG. 24 is an operating sequence diagram of the first pixel circuit 2 according to another embodiment of the present disclosure. In some embodiments of the present disclosure, as shown in FIG. 24, The display panel has a first mode FM and a second mode SM. The first mode FM includes a first data refreshing frequency, the second mode SM includes a second data refreshing frequency, and the first data refreshing frequency is smaller than or equal to the second data refreshing frequency.

A duration of the detection stage T3 in the first mode FM is greater than a duration of the detection stage T3 in the second mode SM.

When the first data refreshing frequency is smaller than the second data refreshing frequency, in a setting manner, referring to FIG. 24, time of one frame of image in the first mode FM is relatively long. Therefore, time of the preposition stage T1 and time of the light-emitting stage T2 are relatively long. In this case, whether the preposition stage T1 includes the detection stage T3 or the light-emitting stage T2 includes the detection stage T3, the duration of the detection stage T3 can be increased accordingly to improve detection accuracy in the first mode FM.

Figure 25:
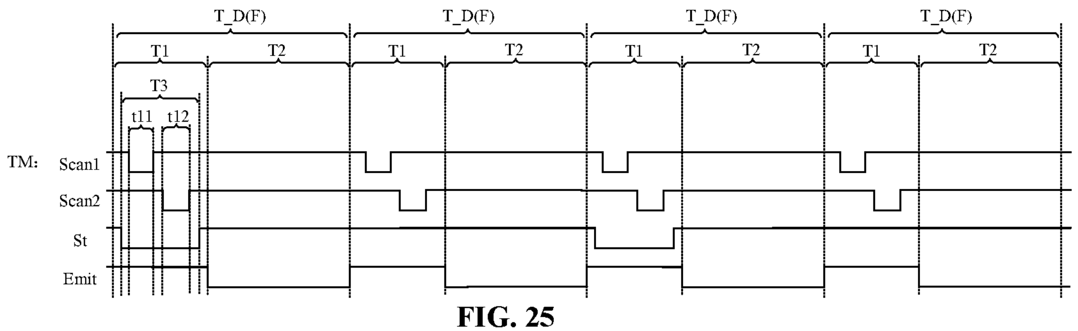
FIG. 25 is an operating sequence diagram of a first pixel circuit according to another embodiment of the present disclosure.

FIG. 25 is an operating sequence diagram of the first pixel circuit 2 according to another embodiment of the present disclosure. In some embodiments of the present disclosure, as shown in FIG. 25, the display panel has a third mode TM. The third mode TM includes a third data refreshing frequency. A frequency at which the detector 5 detects the voltage of the first electrode of the first light-emitting element 3 is smaller than or equal to the third data refreshing frequency. In this case, power consumption can be reduced by reducing the detection frequency, this manner is more suitable for high-frequency driving.

It should be noted that the third mode TM can be the same as the first mode FM or the second mode SM.

In some embodiments of the present disclosure, referring to FIG. 4, the detector 5 includes a detection transistor Mt. A gate of the detection transistor Mt is electrically connected to the control signal line St, a first electrode of the detection transistor Mt is electrically connected to the first electrode of the first light-emitting element 3, and a second electrode of the detection transistor Mt is electrically connected to the detection signal line Vt.

In the detection stage T3, the detection transistor Mt is turned on under the action of the enabling level provided by the control signal line St to transmit the voltage of the first electrode of the first light-emitting element 3 to the detection signal line Vt, such that the driving chip subsequently uses the collected voltage to determine the current temperature of the first light-emitting element 3.

Further, referring to FIG. 4, the display controller 4 includes a driving unit 6 that includes a driving transistor M0. A width to length ratio of the channel of the detection transistor Mt is smaller than a width to length ratio of the channel of the driving transistor M0 to reduce a leakage current of the detection transistor Mt, so that a collected small signal is not distorted, thereby improving the detection accuracy.

Figure 26:
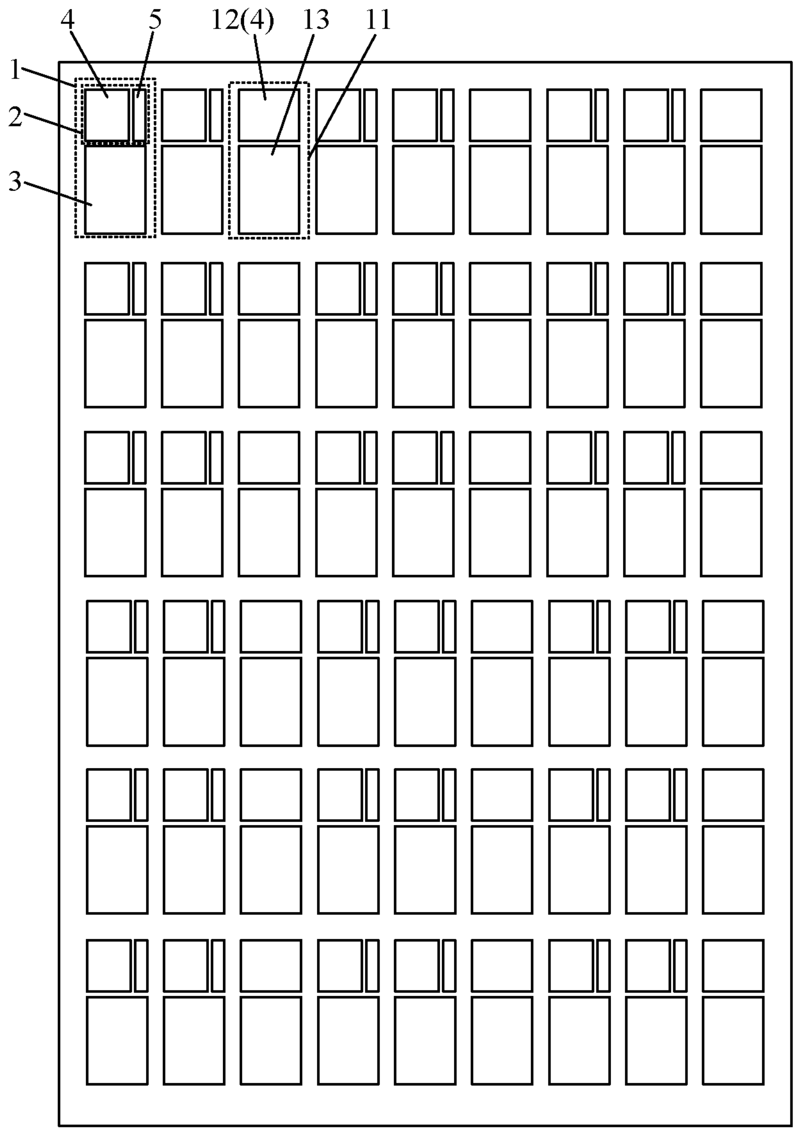
FIG. 26 is a structural schematic diagram of a display panel according to another embodiment of the present disclosure.
Figure 27:
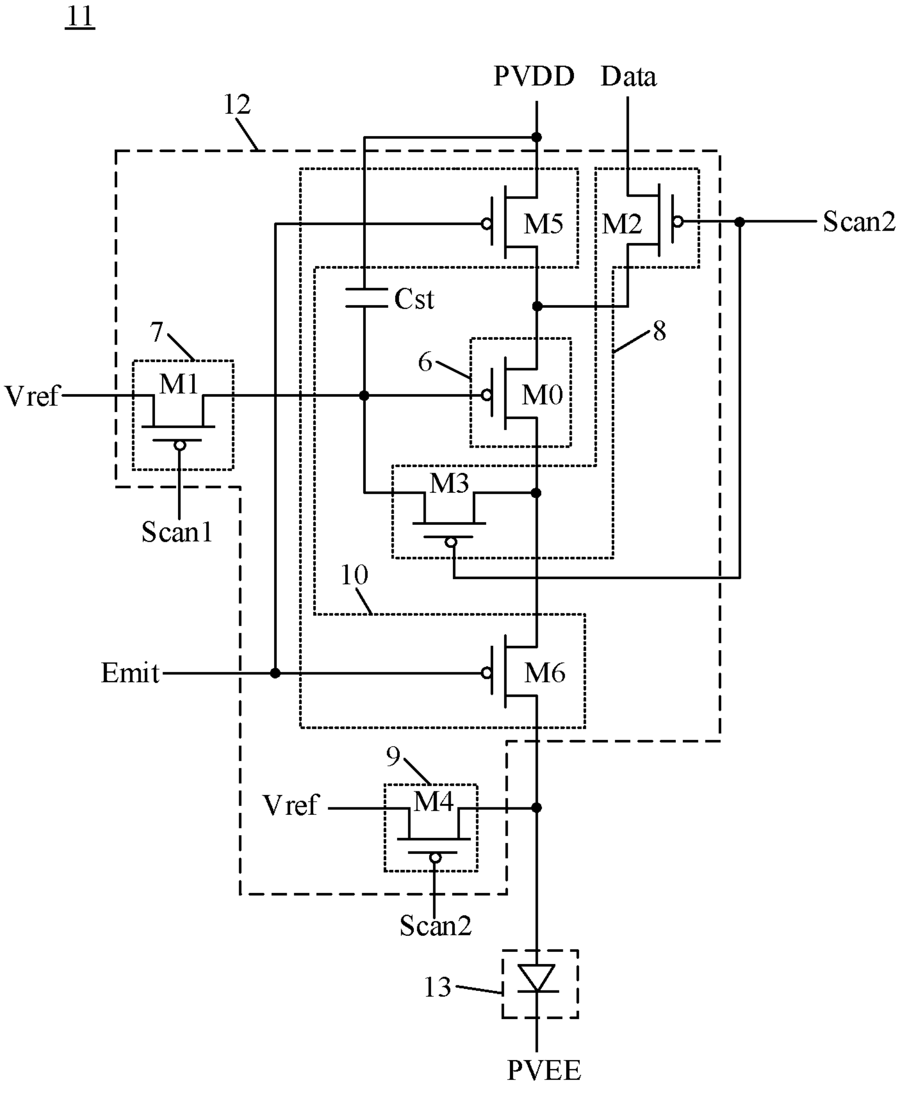
FIG. 27 is a structural schematic diagram of a second sub-pixel according to an embodiment of the present disclosure.

FIG. 26 is a structural schematic diagram of the display panel according to another embodiment of the present disclosure, and FIG. 27 is a structural schematic diagram of a second sub-pixel 11 according to another embodiment of the present disclosure. In some embodiments of the present disclosure, as shown in FIG. 26 and FIG. 27, the display panel further includes second sub-pixels 11. The sub-pixel 11 includes a second pixel circuit 12 and a second light-emitting element 13. The second pixel circuit 12 includes a display controller 4. The display controller 4 has a same structure as the display controller 4 in the first pixel circuit 2, and details are not elaborated herein again.

In this setting manner, only some sub-pixels in the display panel are first sub-pixels 1 for temperature detection. This can reduce the number of detectors 5 required in the display panel to further improve the pixel density or the light transmittance of the display panel.

Figure 28:
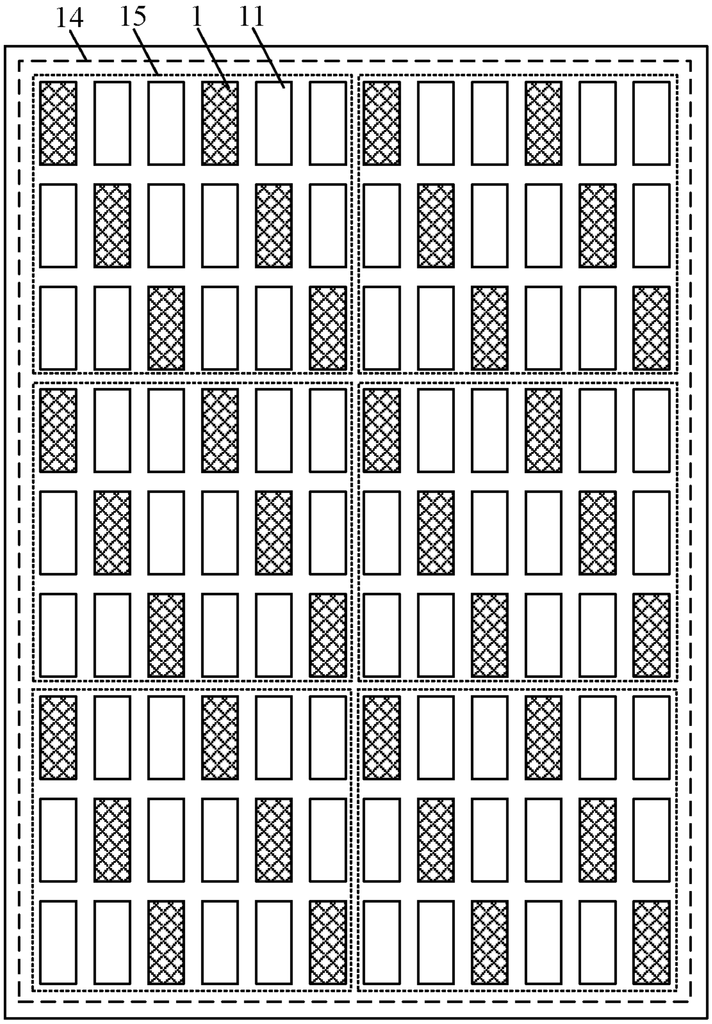
FIG. 28 is a structural schematic diagram of a display panel according to another embodiment of the present disclosure.

FIG. 28 is a structural schematic diagram of the display panel according to another embodiment of the present disclosure. When the display panel includes the first sub-pixel 1 and the second sub-pixel 11, as shown in FIG. 28, the display panel includes a display region 14. The display region 14 includes multiple partitions 15. Each partition 15 includes the first sub-pixel 1 and the second sub-pixel 11. When determining the current temperature of the first light-emitting element 3 based on the voltage detected by the detector 5 for the first electrode of the first light-emitting element 3, the embodiments of the present disclosure can compensate brightness of the second sub-pixel 11 in the partition 15 based on the current temperature of the first light-emitting element 3 in the partition 15. This principle will be explained in detail in subsequent content.

In some embodiments of the present disclosure, as shown in FIG. 3, the display panel can alternatively include the first sub-pixel 1 only. In this case, a voltage of a first electrode of a light-emitting element in each sub-pixel of the display panel can be detected, and further a current temperature of each light-emitting element can be determined respectively to perform targeted compensation for each sub-pixel. This structure can achieve higher compensation accuracy for sub-pixels.

In addition, the driving unit 6 in the embodiments of the present disclosure is not limited to the circuit structure shown in FIG. 4, but can alternatively be another circuit structure that can drive the light-emitting element to emit light. For example, the driving unit 6 can alternatively be a circuit structure of a "PAM+PWM" type shown in FIG. 29.

Figure 29:
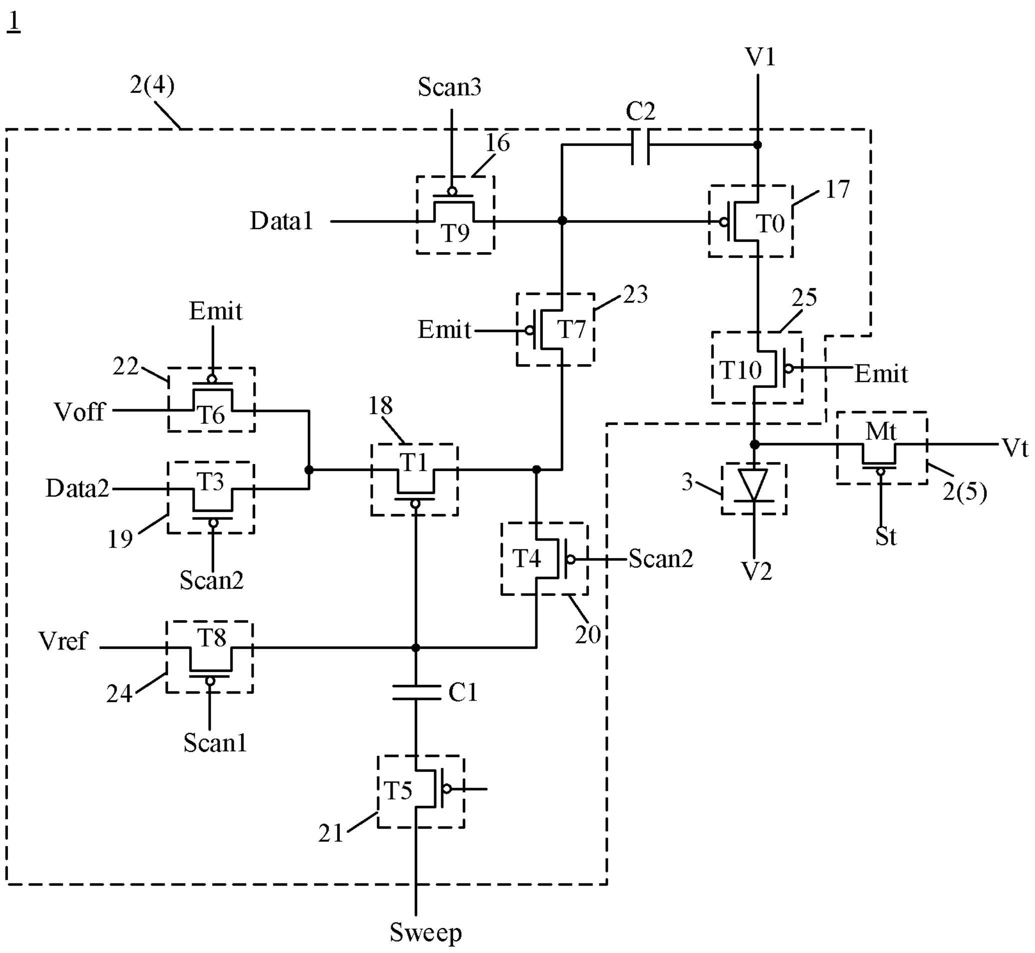
FIG. 29 is yet a structural schematic diagram of a first sub-pixel according to another embodiment of the present disclosure.
Figure 30:
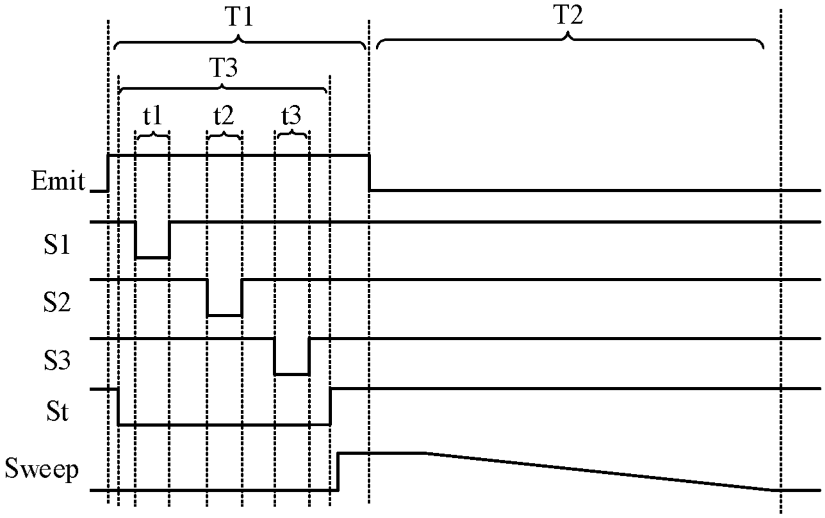
FIG. 30 is an operating sequence diagram of a first pixel circuit according to another embodiment of the present disclosure.

FIG. 29 is yet a structural schematic diagram of a first sub-pixel 2 according to another embodiment of the present disclosure; and FIG. 30 is an operating sequence diagram of a first pixel circuit 2 according to another embodiment of the present disclosure. As shown in FIG. 29 and FIG. 30, the display controller 4 includes an amplitude setting unit 16, a driving unit 17, a switching unit 18, a first data signal writing unit 19, a second data signal writing unit 20, a pulse width control and writing unit 21, a turn-off voltage writing unit 22, a turn-off voltage transmission and control unit 23, a resetting unit 24, a light-emitting control unit 25, a first capacitor C1, and a second capacitor C2.

The driving unit 17 includes a driving transistor Tq.

The amplitude setting unit 16 includes a ninth transistor T9. A gate of the ninth transistor T9 is electrically connected to a third scan signal line Scan3, a first electrode of the ninth transistor T9 is electrically connected to and a first data line Data1, and a second electrode of the ninth transistor T9 is electrically connected to a gate of the driving transistor Tq.

The first data signal writing unit 19 includes a third transistor T3. A gate of the third transistor T3 is electrically connected to the second scan signal line Scan2, and a first electrode of the third transistor T3 is electrically connected to a second data line Data2.

The turn-off voltage writing unit 22 includes a sixth transistor T6. A gate of the sixth transistor T6 is electrically connected to the light-emitting control signal line Emit, and a first electrode of the sixth transistor T6 is electrically connected to a turn-off voltage signal line Voff.

The switching unit 18 includes a first transistor T1. A first electrode of the first transistor T1 is electrically connected to a second electrode of the third transistor T3 and a second electrode of the sixth transistor T6.

The first data signal writing unit 19 includes a fourth transistor T4. A gate of the fourth transistor T4 is electrically connected to the second scan signal line Scan2, a first electrode of the fourth transistor T4 is electrically connected to a gate of the first transistor T1, and a second electrode of the fourth transistor T4 is electrically connected to a second electrode of the first transistor T1.

The pulse width control and writing unit 21 includes a fifth transistor T5. A first electrode of the fifth transistor T5 is electrically connected to a pulse width control signal line Sweep, and a second electrode of the fifth transistor T5 is electrically connected to the gate of the first transistor T1 through the first capacitor C1.

The resetting unit 24 includes an eighth transistor T8. A gate of the eighth transistor T8 is electrically connected to the first scan signal line Scan1, a first electrode of the eighth transistor T8 is electrically connected to the reset signal line Vref, and a second electrode of the eighth transistor T8 is electrically connected to the gate of the first transistor T1.

The turn-off voltage transmission and control unit 23 includes a seventh transistor T7. A gate of the seventh transistor T7 is electrically connected to the light-emitting control signal line Emit, a first electrode of the seventh transistor T7 is electrically connected to the second electrode of the first transistor T1, and a second electrode of the seventh transistor T7 is electrically connected to the gate of the driving transistor Tq.

The light-emitting control unit 25 includes a tenth transistor T10. A gate of the tenth transistor T10 is electrically connected to the light-emitting control signal line Emit, a first electrode of the tenth transistor T10 is electrically connected to a second electrode of the driving transistor Tq, and a second electrode of the tenth transistor T10 is electrically connected to the first electrode of the first light-emitting element.

The second capacitor C2 is electrically connected between a first fixed potential signal line V1 and the gate of the driving transistor Tq.

An operating process of the first pixel circuit includes a preposition stage T1 and a light-emitting stage T2. The preposition stage includes a first stage t1, a second stage t2, and a third stage t3.

In the first stage t1, the first scan signal line Scan1 provides an enabling level (low level), and the eighth transistor T8 is turned on to transmit a resetting voltage provided by the reset signal line Vref to the gate of the first transistor T1.

In the second stage t2, the second scan signal line Scan2 provides an enabling level (low level), the third transistor T3 is turned on to transmit a second data voltage $V_{D2}$ of the second data line Data2 to the first electrode of the first transistor T1, and the fourth transistor T4 is synchronously turned on, such that the second electrode and the gate of the first transistor T1 form a loop and a gate voltage of the first transistor T1 becomes $V_{D2}$+Vth.

In the third stage t3, the third scan signal line Scan3 provides an enabling level (low level), and the ninth transistor T9 is turned on to transmit a first data voltage of the first data line Data1 to the gate of the driving transistor Tq and store the first data voltage in the second capacitor C2. The second capacitor C2 is configured to maintain a potential of the gate of the driving transistor Tq.

In the light-emitting stage T2, the light-emitting control signal line Emit provides an enabling level (low level), the tenth transistor T10 is turned on, the driving transistor Tq transmits a driving current converted from the first data voltage $V_{D1}$ and a first fixed voltage $V_1$ to the first electrode of the first light-emitting element, the seventh transistor T7 is turned on, and the sixth transistor T6 is turned on. The sixth transistor T6 transmits a turn-off voltage provided by the turn-off voltage signal line Voff to the first electrode of the first transistor T1.

The gate of the first transistor T1 is connected to one plate of the first capacitor C1. Therefore, when a pulse width control signal provided by the pulse width control signal line Sweep is input into another plate of the first capacitor C1, the gate voltage of the first transistor T1 jumps from $V_{D2}$+Vth to $V_{D2}$+Vth+Va. Then the gate voltage of the first transistor T1 changes, starting from $V_{D2}$+Vth+Va, at a slope the same as a linear change slope of the pulse width control signal until it is lower than Vth, to turn on the first transistor T1 to change from a high-impedance state to a turned on state. In this way, the turn-off voltage is transmitted to the gate of the driving transistor Tq through the first transistor T1. Under the action of the turn-off voltage, the driving transistor Tq changes from the turn-on state to the high-impedance state, and stops outputting the driving current to the first electrode of the first light-emitting element of the pixel. Therefore, a turn-on duration of the driving transistor Tq is jointly determined by a second data signal and the pulse width control signal.

Figure 31:
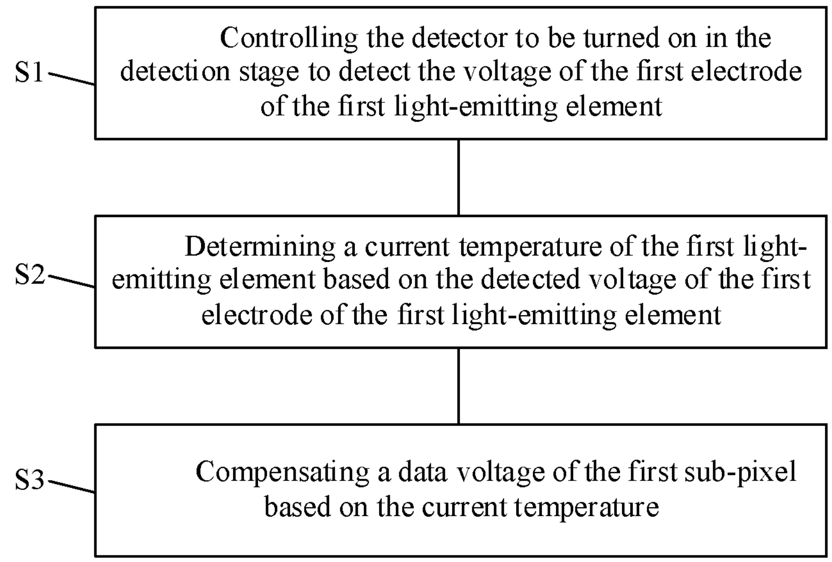
FIG. 31 is a flowchart of a method for driving a display panel according to an embodiment of the present disclosure.

Based on a same inventive concept, the embodiments of the present disclosure further provide a method for driving a display panel. The method is applied to the display panel described above. FIG. 31 is a flowchart of a method for driving a display panel according to an embodiment of the present disclosure. Referring to FIG. 3 and FIG. 4, as shown in FIG. 31, the method for driving the display panel includes following steps.

At step S1, in the detection stage T3, the detector 5 is turned on to detect the voltage of the first electrode of the first light-emitting element 3.

At step S2, the current temperature of the first light-emitting element 3 is determined based on the detected voltage of the first electrode of the first light-emitting element 3.

At step S3, a data voltage of the first sub-pixel 1 is compensated based on the current temperature.

Based on the above analysis, the embodiments of the present disclosure use a characteristic that a forward voltage drop of an LED varies with a temperature. The voltage of the first electrode of the first light-emitting element 3 is detected through the detector 5, such that a forward voltage drop of the first light-emitting element 3 can be accurately obtained based on the detected voltage, thereby obtaining the current temperature of the first light-emitting element 3. Therefore, brightness compensation can be performed for the first sub-pixel 1 based on the current temperature of the first light-emitting element 3 subsequently to adjust brightness of the first sub-pixel 1 and effectively reduce an impact of a temperature change on a display effect.

Figure 32:
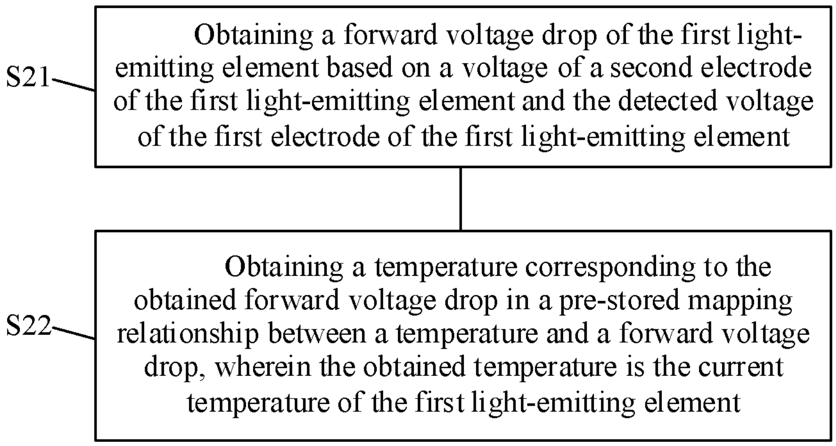
FIG. 32 is another flowchart of a method for driving a display panel according to an embodiment of the present disclosure.

FIG. 32 is a flowchart of a method for driving a display panel according to another embodiment of the present disclosure. In some embodiments of the present disclosure, as shown in FIG. 32, the step S2 can include following steps.

At step S21, the forward voltage drop of the first light-emitting element 3 is obtained based on a voltage of the second electrode of the first light-emitting element 3 and the detected voltage of the first electrode of the first light-emitting element 3.

At step S22, a temperature corresponding to the obtained forward voltage drop is obtained in a pre-stored mapping relationship between a temperature and a forward voltage drop. The obtained temperature is the current temperature of the first light-emitting element 3. For the mapping relationship between the temperature and the forward voltage drop, reference can be made to Table 1.

After the voltage of the first electrode of the first light-emitting element 3 is detected by using the detector 5, because the second electrode of the first light-emitting element 3 in the display panel receives a same negative supply voltage, the forward voltage drop of the first light-emitting element 3 can be obtained based on the voltage of the second electrode of the first light-emitting element 3 and the detected voltage of the first electrode of the first light-emitting element 3. Further, the temperature corresponding to the calculated forward voltage drop can be calculated based on the mapping relationship between the temperature and the forward voltage drop.

In some embodiments of the present disclosure, at the step S3, compensation data corresponding to the current temperature is obtained in a temperature-to-compensation data mapping relationship corresponding to a current brightness node, and the data voltage of the first sub-pixel 1 is compensated based on the found compensation data. In a temperature-to-compensation data mapping relationship corresponding to one brightness node, different grayscale currents correspond to same compensation data at a same temperature.

In the above compensation manner, different grayscale currents under a brightness node correspond to same compensation data at a same temperature. That is, after the current temperature of the first light-emitting element 3 is obtained, regardless of a grayscale current received by the first light-emitting element 3 under the current brightness node, the same compensation data is used to compensate the brightness of the first sub-pixel 1. This manner can reduce the number of temperature-to-compensation data mapping relationships pre-stored in a driving chip, thereby reducing an amount of data to be stored.

Figure 33:
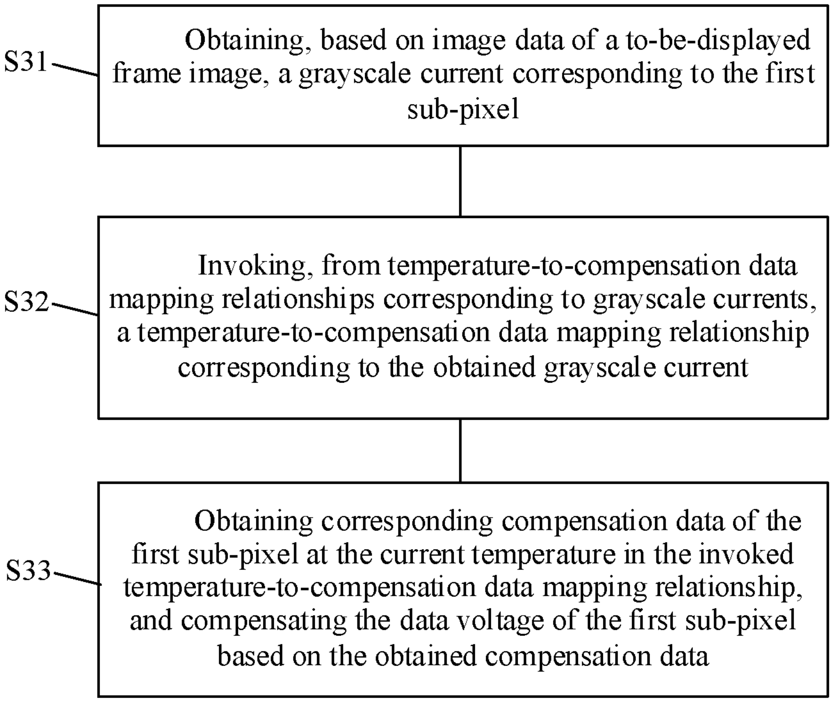
FIG. 33 is a flowchart of a method for driving a display panel according to another embodiment of the present disclosure.

FIG. 33 is a flowchart of the method for driving a display panel according to another embodiment of the present disclosure. Alternatively, in some embodiments of the present disclosure, as shown in FIG. 33, the step S3 can include following steps.

At step S31, a grayscale current corresponding to the first sub-pixel 1 is obtained based on image data of a to-be-displayed frame image.

At step S32, a temperature-to-compensation data mapping relationship corresponding to the obtained grayscale current is invoked from multiple temperature-to-compensation data mapping relationships corresponding to multiple grayscale currents.

At step S33, corresponding compensation data of the first sub-pixel 1 at the current temperature is obtained in the called temperature-to-compensation data mapping relationship, and the data voltage of the first sub-pixel 1 is compensated based on the found compensation data.

In the above compensation method, different grayscale currents under a brightness node correspond to different compensation data at a same temperature. After the grayscale current corresponding to the first sub-pixel 1 is obtained based on the image data of the to-be-displayed frame image, the compensation data corresponding to the current temperature can be obtained in the temperature-to-compensation data mapping relationship corresponding to the grayscale current. This makes the compensation for the first sub-pixel 1 more accurate and achieves a better compensation effect.

In some embodiments of the present disclosure, referring to FIG. 26 to FIG. 28, the display panel further includes second sub-pixels 11. The sub-pixel 11 includes a second pixel circuit 12 and a second light-emitting element 13. The second pixel circuit 12 includes a display controller. The display panel includes a display region 14 that includes multiple partitions 15. The partition 15 includes the first sub-pixel 1 and the second sub-pixel 11.

The method for driving a display panel further includes: compensating a data voltage of the second sub-pixel 11 in the partition 15 based on the current temperature of the first light-emitting element 3 in the partition 15.

The above compensation adopts a partition compensation method in which it is not required to set all sub-pixels in the display panel as first sub-pixels 1, which means that it is not required to perform temperature detection for each sub-pixel. This can reduce the number of detectors 5 required in the display panel, and can also reduce the amount of data processing.

Further, a process of compensating the data voltage of the second sub-pixel 11 in the partition 15 based on the current temperature of the first light-emitting element 3 in the partition 15 includes: calculating, based on the current temperature of each first light-emitting element 3 in the partition 15, an average temperature corresponding to the partition 15; and compensating the data voltage of the second sub-pixel 11 based on the average temperature.

This manner performs brightness compensation for the second sub-pixel 11 based on the average temperature of the partition 15 of the second light-emitting element 13. The average temperature of the partition 15 does not differ significantly from the current temperature of the second light-emitting element 13, thus improving accuracy of the compensation for the second sub-pixel 11 and making the brightness compensation for the second sub-pixel 11 better match an actual current temperature of the second sub-pixel 11.

Figure 34:
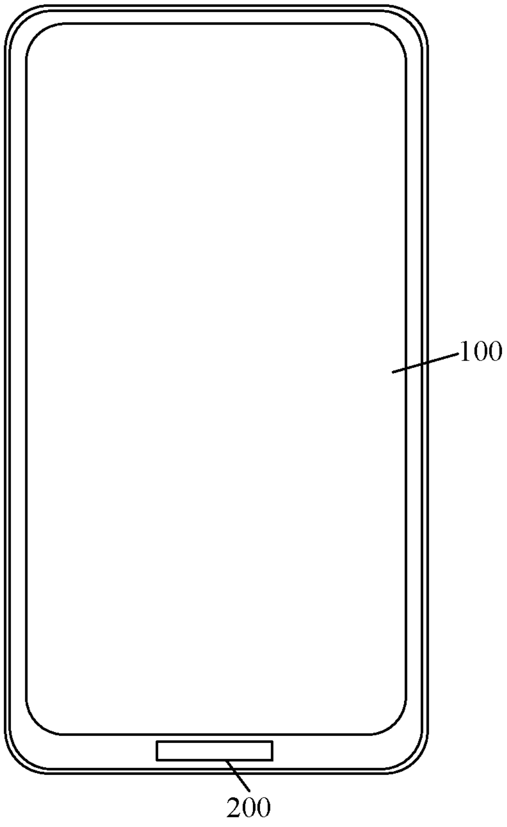
FIG. 34 is a structural schematic diagram of a display apparatus according to an embodiment of the present disclosure.

Based on a same inventive concept, the embodiments of the present disclosure further provide a display apparatus. FIG. 34 is a structural schematic diagram of a display apparatus according to an embodiment of the present disclosure. As shown in FIG. 34, the display apparatus includes the above display panel 100 and a driving chip 200. The driving chip 200 is configured to determine a current temperature of a first light-emitting element 3 based on a detected voltage of a first electrode of the first light-emitting element 3, and compensate a data voltage of a first sub-pixel 1 based on the current temperature.

Structure of the display panel 100 has been described in detail in the foregoing embodiments. Details are not elaborated herein again. The display apparatus shown in FIG. 34 is for schematic description only. The display apparatus can be any electronic device with a display function, such as a mobile phone, a tablet computer, a laptop computer, an e-book, or a television.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

What is claimed is:

1. A display panel, comprising:

first sub-pixels, wherein at least one of the first sub-pixels comprises a first pixel circuit and a first light-emitting element, the first pixel circuit comprises a display controller and a detector that are electrically connected to a first electrode of the first light-emitting element, respectively;

wherein an operating process of the first pixel circuit comprises a detection stage, and wherein during the detection stage the detector is turned on to detect a voltage of the first electrode of the first light-emitting element;

wherein the display panel has a first mode comprising a first data refreshing frequency and a second mode comprising a second data refreshing frequency, wherein the first data refreshing frequency is smaller than or equal to the second data refreshing frequency;

a frequency at which the detector detects the voltage of the first electrode of the first light-emitting element is greater than or equal to the first data refreshing frequency, and smaller than or equal to the second data refreshing frequency; or the display panel has a first mode comprising a first data refreshing frequency and a second mode comprising a second data refreshing frequency, wherein the first data refreshing frequency is smaller than or equal to the second data refreshing frequency; and a duration of the detection stage in the first mode is greater than a duration of the detection stage in the second mode.

2. The display panel according to claim 1, wherein during one frame of image of the display panel, the operating process of the first pixel circuit comprises a preposition stage and a light-emitting stage; and during at least one frame of image, the light-emitting stage comprises the detection stage, and during the detection stage, the display controller provides a driving current to the first light-emitting element, and the detector is turned on to detect the voltage of the first electrode of the first light-emitting element.

3. The display panel according to claim 2, wherein a duration of the detection stage is equal to a duration of the light-emitting stage.

4. The display panel according to claim 1, wherein during displaying one frame of image of the display panel, the operating process of the first pixel circuit comprises a preposition stage and a light-emitting stage; and during displaying at least one frame of image, the preposition stage comprises the detection stage, and in the detection stage, the detector is turned on to provide a driving current to the first light-emitting element and detect the voltage of the first electrode of the first light-emitting element.

5. The display panel according to claim 4, wherein the display controller comprises a gate resetting unit, a charging unit, and a driving unit, and the driving unit comprises a driving transistor; and the preposition stage further comprises a resetting stage and a data writing stage subsequent to the resetting stage, wherein during the resetting stage, the gate resetting unit is turned on to reset a gate of the driving transistor, and in the data writing stage, and the charging unit is turned on to write a data voltage into the gate of the driving transistor.

6. The display panel according to claim 5, wherein the detection stage is executed prior to the resetting stage, and at an end of the detection stage, the gate resetting unit is turned on to enter the resetting stage;

the detection stage is located between the resetting stage and the data writing stage, wherein at an end of the resetting stage, the detector is turned on to enter the detection stage, and at the end of the detection stage, the charging unit is turned on to enter the data writing stage; or the detection stage is executed subsequent to the data writing stage, and at an end of the data writing stage, the detector is turned on to enter the detection stage.

7. The display panel according to claim 5, wherein a time period of the detection stage overlaps at least partially with a time period of the resetting stage, or a time period of the detection stage overlaps at least partially with a time period of the data writing stage.

8. The display panel according to claim 7, wherein the detector is electrically connected to a control signal line, the detector is turned on in response to a control signal provided by the control signal line, the gate resetting unit is electrically connected to a first scan signal line, and the gate resetting unit is turned on in response to a first scan signal provided by the first scan signal line, wherein the detection stage overlaps with the resetting stage, and the control signal line is reused as the first scan signal line.

9. The display panel according to claim 7, wherein the detector is electrically connected to a control signal line, the detector is turned on in response to a control signal provided by the control signal line, the charging unit is electrically connected to a second scan signal line, and the charging unit is turned on in response to a second scan signal provided by the second scan signal line, wherein the detection stage overlaps with the data writing stage, and the control signal line is reused as the second scan signal line.

10. The display panel according to claim 7, wherein after entering the detection stage, the gate resetting unit is turned on to enter the resetting stage, and before the end of the detection stage, the charging unit is turned on to enter the data writing stage.

11. The display panel according to claim 5, wherein a duration of the detection stage is greater than a duration of the resetting stage, and the duration of the detection stage is greater than a duration of the data writing stage.

12. The display panel according to claim 4, wherein the detection stage comprises at least two sub-stages, and a first interval stage is provided between two adjacent sub-stages, wherein, in a sub-stage, the detector is turned on to provide the driving current to the first light-emitting element and detect the voltage of the first electrode of the first light-emitting element; and a duration of the sub-stage is greater than a duration of the first interval stage.

13. The display panel according to claim 1, wherein the detector comprises a detection transistor, the detection transistor has a gate electrically connected to a control signal line, a first electrode electrically connected to the first electrode of the first light-emitting element, and a second electrode electrically connected to a detection signal line; and the display controller comprises a driving unit that comprises a driving transistor, and a width to length ratio of a channel of the detection transistor is smaller than a width to length ratio of a channel of the driving transistor.

14. The display panel according to claim 1, wherein the display controller comprises a charging unit and a driving unit, and the driving unit comprises a driving transistor;

a data refreshing cycle of the display panel comprises a time period for displaying S frames of image, wherein S>1, the data refreshing cycle comprises writing frames and holding frames, at least one of the writing frames comprises a data writing stage, at least one of the holding frames does not comprise the data writing stage, and in the data writing stage, the charging unit is turned on to write a data voltage into a gate of the driving transistor;

at least part of the writing frame comprises the detection stage; or at least one holding frame comprises the detection stage.

15. A method for driving a display panel, wherein the display panel comprises:

first sub-pixels, wherein at least one of the first sub-pixels comprises a first pixel circuit and a first light-emitting element, the first pixel circuit comprises a display controller and a detector that are electrically connected to a first electrode of the first light-emitting element, respectively;

an operating process of the first pixel circuit comprises a detection stage, and during the detection stage, the detector is turned on to detect a voltage of the first electrode of the first light-emitting element;

wherein the display panel has a first mode comprising a first data refreshing frequency and a second mode comprising a second data refreshing frequency, wherein the first data refreshing frequency is smaller than or equal to the second data refreshing frequency;

a frequency at which the detector detects the voltage of the first electrode of the first light-emitting element is greater than or equal to the first data refreshing frequency, and smaller than or equal to the second data refreshing frequency; or the display panel has a first mode comprising a first data refreshing frequency and a second mode comprising a second data refreshing frequency, wherein the first data refreshing frequency is smaller than or equal to the second data refreshing frequency; and a duration of the detection stage in the first mode is greater than a duration of the detection stage in the second mode;

the method comprising:

controlling the detector to be turned on in the detection stage to detect the voltage of the first electrode of the first light-emitting element;

determining a current temperature of the first light-emitting element based on a detected voltage of the first electrode of the first light-emitting element; and compensating a data voltage of the first sub-pixel based on the current temperature.

16. The method according to claim 15, wherein the determining the current temperature of the first light-emitting element based on the detected voltage of the first electrode of the first light-emitting element comprises:

obtaining a forward voltage drop of the first light-emitting element based on a voltage of a second electrode of the first light-emitting element and the detected voltage of the first electrode of the first light-emitting element; and obtaining a temperature corresponding to the obtained forward voltage drop in a pre-stored mapping relationship between the temperature and a forward voltage drop, wherein the obtained temperature is the current temperature of the first light-emitting element.

17. The method according to claim 15, wherein the compensating the data voltage of the first sub-pixel based on the current temperature comprises:

obtaining compensation data corresponding to the current temperature in a temperature-to-compensation data mapping relationship corresponding to a current brightness node, and compensating the data voltage of the first sub-pixel based on the obtained compensation data, wherein in a temperature-to-compensation data mapping relationship corresponding to one brightness node, different grayscale currents correspond to same compensation data at a same temperature; or the compensating the data voltage of the first sub-pixel based on the current temperature comprises:

obtaining, based on image data of a to-be-displayed frame image, a grayscale current corresponding to the first sub-pixel;

invoking, from temperature-to-compensation data mapping relationships corresponding to grayscale currents, a temperature-to-compensation data mapping relationship corresponding to the obtained grayscale current; and obtaining corresponding compensation data of the first sub-pixel at the current temperature in the invoked temperature-to-compensation data mapping relationship, and compensating the data voltage of the first sub-pixel based on the obtained compensation data.

18. The method according to claim 15, wherein the display panel further comprises a second sub-pixel, the second sub-pixel comprises a second pixel circuit and a second light-emitting element, and the second pixel circuit comprises the display controller;

the display panel comprises a display region that comprises partitions, wherein at least one of the partitions comprises the first sub-pixel and the second sub-pixel; and the method further comprises: compensating a data voltage of the second sub-pixel in the partition based on the current temperature of the first light-emitting element in the partition; and the compensating the data voltage of the second sub-pixel in the partition based on the current temperature of the first light-emitting element in the partition comprises:

calculating, based on the current temperature of the first light-emitting element in the partition, an average temperature corresponding to the partition; and compensating the data voltage of the second sub-pixel based on the average temperature.

19. A display apparatus, comprising:

a display panel; and a driving chip configured to determine a current temperature of the first light-emitting element based on a detected voltage of the first electrode of the first light-emitting element, and to compensate a data voltage of the first sub-pixel based on the current temperature, wherein the display panel comprises:

first sub-pixels, wherein at least one of the first sub-pixels comprises a first pixel circuit and a first light-emitting element, wherein the first pixel circuit comprises a display controller and a detector that are electrically connected to a first electrode of the first light-emitting element, respectively; and an operating process of the first pixel circuit comprises a detection stage, and during the detection stage, the detector is turned on to detect a voltage of the first electrode of the first light-emitting element;

wherein the display panel has a first mode comprising a first data refreshing frequency and a second mode comprising a second data refreshing frequency, wherein the first data refreshing frequency is smaller than or equal to the second data refreshing frequency;

a frequency at which the detector detects the voltage of the first electrode of the first light-emitting element is greater than or equal to the first data refreshing frequency, and smaller than or equal to the second data refreshing frequency; or the display panel has a first mode comprising a first data refreshing frequency and a second mode comprising a second data refreshing frequency, wherein the first data refreshing frequency is smaller than or equal to the second data refreshing frequency; and a duration of the detection stage in the first mode is greater than a duration of the detection stage in the second mode.

* * * * *